United States Patent
Kumar et al.

(10) Patent No.: US 12,210,813 B2
(45) Date of Patent: Jan. 28, 2025

(54) GENERATING A MULTI-MODAL VECTOR REPRESENTING A SOURCE FONT AND IDENTIFYING A RECOMMENDED FONT UTILIZING A MULTI-MODAL FONT MACHINE-LEARNING MODEL

(71) Applicant: Adobe Inc., San Jose, CA (US)

(72) Inventors: Pranay Kumar, Noida (IN); Nipun Jindal, Delhi (IN)

(73) Assignee: Adobe Inc., San Jose, CA (US)

( * ) Notice: Subject to any disclaimer, the term of this patent is extended or adjusted under 35 U.S.C. 154(b) by 20 days.

(21) Appl. No.: 18/051,720

(22) Filed: Nov. 1, 2022

(65) Prior Publication Data

US 2024/0143897 A1    May 2, 2024

(51) Int. Cl.
*G06F 40/109* (2020.01)
(52) U.S. Cl.
CPC ............................... *G06F 40/109* (2020.01)
(58) Field of Classification Search
CPC ....................................................... G06F 40/109
See application file for complete search history.

(56) References Cited

U.S. PATENT DOCUMENTS

| | | | | |
|---|---|---|---|---|
| 8,170,372 B2* | 5/2012 | Kennedy | ................. | G06F 18/00 382/291 |
| 8,488,886 B2* | 7/2013 | Hammond | ........... | G06V 30/245 707/804 |
| 8,548,259 B2* | 10/2013 | Tuganbaev | ........... | G06F 18/254 382/161 |
| 8,660,371 B2* | 2/2014 | Tuganbaev | ........... | G06F 18/254 382/160 |
| 9,014,481 B1* | 4/2015 | Luqman | ............... | G06V 30/245 382/185 |
| 9,317,777 B2* | 4/2016 | Kaasila | ................. | G06F 40/109 |
| 9,501,724 B1* | 11/2016 | Yang | ......................... | G06T 3/40 |
| 9,576,196 B1* | 2/2017 | Natarajan | ............... | G06V 20/63 |
| 9,805,288 B2* | 10/2017 | Kaasila | ................. | G06F 18/214 |

(Continued)

FOREIGN PATENT DOCUMENTS

| CN | 116681795 A | * 9/2023 |
|---|---|---|
| CN | 117173704 A | * 12/2023 |

(Continued)

OTHER PUBLICATIONS

Tao, Zhulin et al. "MGAT: Multimodal Graph Attention Network for Recommendation." Inf. Process. Manag. 57 (2020): 102277. (Year: 2020).*

(Continued)

*Primary Examiner* — Benjamin Smith
(74) *Attorney, Agent, or Firm* — Keller Preece PLLC

(57) ABSTRACT

The present disclosure relates to systems, methods, and non-transitory computer-readable media that generates a multi-modal vector and identifies a recommended font corresponding to the source font based on the multi-modal vector. For instance, in one or more embodiments, the disclosed systems receive an indication of a source font and determines font embeddings and glyph metrics embedding. Furthermore, the disclosed system generates, utilizing a multi-modal font machine-learning model, a multi-modal vector representing the source font based on the font embeddings and the glyph metrics embedding.

20 Claims, 20 Drawing Sheets

(56) References Cited

U.S. PATENT DOCUMENTS

| | | | |
|---|---|---|---|
| 9,824,304 B2 | 11/2017 | Wang et al. | |
| 9,911,033 B1* | 3/2018 | Harary | G06V 30/19173 |
| 10,115,215 B2* | 10/2018 | Matteson | G06T 11/60 |
| 10,409,896 B2* | 9/2019 | Jain | G06V 30/418 |
| 10,515,295 B2* | 12/2019 | Liu | G06N 3/045 |
| 10,515,296 B2* | 12/2019 | Liu | G06F 18/2148 |
| 10,592,787 B2* | 3/2020 | Liu | G06V 30/245 |
| 10,878,298 B2* | 12/2020 | Wang | G06F 18/2148 |
| 11,003,831 B2 | 5/2021 | Wang et al. | |
| 11,216,658 B2* | 1/2022 | Singh | G06V 30/245 |
| 11,244,205 B2* | 2/2022 | Srivastava | G06N 3/045 |
| 11,244,207 B2* | 2/2022 | Wang | G06V 10/82 |
| 11,295,181 B2* | 4/2022 | Kumawat | G06F 40/166 |
| 11,393,187 B2* | 7/2022 | Dhanuka | G06F 16/56 |
| 11,475,072 B2* | 10/2022 | Mueller | G06N 20/10 |
| 11,481,605 B2* | 10/2022 | Nguyen | G06V 10/82 |
| 11,501,477 B2* | 11/2022 | Kumawat | G06T 11/60 |
| 11,537,262 B1* | 12/2022 | Kaasila | G06F 3/0482 |
| 11,636,147 B2* | 4/2023 | Wang | G06F 16/5846 382/157 |
| 11,636,251 B2* | 4/2023 | Kadia | G06V 10/764 715/269 |
| 11,657,602 B2* | 5/2023 | Kaasila | G06N 20/00 382/161 |
| 11,727,192 B2* | 8/2023 | Jindal | G06F 40/171 715/269 |
| 11,763,583 B2* | 9/2023 | Singh | G06V 10/82 382/161 |
| 11,775,734 B2* | 10/2023 | Sharma | G06F 40/109 715/269 |
| 11,836,584 B2* | 12/2023 | Mueller | G06N 20/10 |
| 11,842,524 B2* | 12/2023 | Desai | G06V 10/98 |
| 2009/0028443 A1* | 1/2009 | Chen | G06V 30/19127 382/224 |
| 2011/0274345 A1* | 11/2011 | Tuganbaev | G06F 18/254 382/159 |
| 2011/0289407 A1* | 11/2011 | Naik | G06F 40/109 715/269 |
| 2012/0027308 A1* | 2/2012 | Hammond | G06V 30/245 382/203 |
| 2012/0033852 A1* | 2/2012 | Kennedy | G06F 18/00 382/103 |
| 2013/0044943 A1* | 2/2013 | Tuganbaev | G06F 18/254 382/161 |
| 2015/0278167 A1* | 10/2015 | Arnold | G06F 40/109 382/224 |
| 2016/0171343 A1* | 6/2016 | Kaasila | G06T 11/60 345/471 |
| 2016/0307347 A1* | 10/2016 | Matteson | G06F 18/22 |
| 2016/0314377 A1* | 10/2016 | Vieira | G06F 40/109 |
| 2018/0068180 A1* | 3/2018 | Harary | G06F 18/2411 |
| 2018/0114142 A1* | 4/2018 | Mueller | G06F 16/906 |
| 2019/0108203 A1* | 4/2019 | Wang | G06F 40/109 |
| 2019/0130231 A1* | 5/2019 | Liu | G06N 3/045 |
| 2019/0130232 A1* | 5/2019 | Kaasila | G06N 20/00 |
| 2019/0138860 A1* | 5/2019 | Liu | G06V 30/19173 |
| 2019/0147304 A1* | 5/2019 | Liu | G06F 18/2148 382/157 |
| 2019/0243875 A1* | 8/2019 | Jain | G06V 30/418 |
| 2020/0151442 A1* | 5/2020 | Singh | G06V 10/82 |
| 2020/0272689 A1* | 8/2020 | Kumawat | G06F 18/213 |
| 2020/0285916 A1* | 9/2020 | Wang | G06F 16/90335 |
| 2020/0311467 A1* | 10/2020 | Srivastava | G06V 30/153 |
| 2021/0081452 A1* | 3/2021 | Mueller | G06N 5/04 |
| 2021/0103632 A1* | 4/2021 | Kadia | G06V 10/82 |
| 2021/0103783 A1* | 4/2021 | Wang | G06N 3/084 |
| 2021/0118207 A1* | 4/2021 | Kumawat | G06F 40/109 |
| 2021/0125034 A1* | 4/2021 | Nguyen | G06N 3/084 |
| 2021/0133477 A1* | 5/2021 | Dhanuka | G06F 16/9014 |
| 2021/0141464 A1* | 5/2021 | Jain | G06F 3/0236 |
| 2022/0083772 A1* | 3/2022 | Singh | G06F 18/2148 |
| 2022/0148325 A1* | 5/2022 | Wang | G06F 16/55 |
| 2022/0284169 A1* | 9/2022 | Jindal | G06F 40/109 |
| 2022/0301244 A1* | 9/2022 | Kumawat | G06T 11/203 |
| 2022/0350998 A1* | 11/2022 | Desai | G06N 3/0442 |
| 2022/0351489 A1* | 11/2022 | Dhanuka | G06V 30/262 |
| 2022/0358280 A1* | 11/2022 | Shirani | G06F 40/109 |
| 2022/0382962 A1* | 12/2022 | Schwiebert | G06F 40/109 |
| 2022/0414314 A1* | 12/2022 | Zhang | G06N 3/09 |
| 2023/0070390 A1* | 3/2023 | Weng | G06F 40/109 |
| 2023/0110114 A1* | 4/2023 | Reddy | G06T 3/40 345/660 |
| 2023/0244849 A1* | 8/2023 | Kadia | G06F 40/109 715/269 |
| 2023/0334223 A1* | 10/2023 | Jindal | G06F 3/03545 |
| 2023/0384910 A1* | 11/2023 | Kaasila | G06F 3/0481 |

FOREIGN PATENT DOCUMENTS

| | | | | |
|---|---|---|---|---|
| CN | 117197811 A | * | 12/2023 | |
| GB | 2578988 A | * | 6/2020 | G06T 11/001 |
| WO | WO-2023231987 A1 | * | 12/2023 | |

OTHER PUBLICATIONS

Junho Cho,, "Font Representation Learning via Paired-glyph Matching", Nov. 20, 2022, 20 pages, https://doi.org/10.48550/arXiv.2211.10967 (Year: 2022).*

Muthivhi, M., (2022). Multi-modal Recommendation System with Auxiliary Information. In: Pillay, A., Jembere, E., Gerber, A. (eds) Artificial Intelligence Research. SACAIR 2022. Communications in Computer and Information Science, vol. 1734. Springer, Cham. https://doi.org/10.1007/978-3-031-22321-1_8 (Year: 2022).*

David G. Lowe Distinctive Image Features from Scale-Invariant Keypoints. Year 2004, https://www.cs.ubc.ca/~lowe/papers/ijcv04.pdf.

Z. Wang, J. Yang et al. DeepFont: Identify Your Font from an Image arXiv:1507.03196 Year 2015 https://arxiv.org/pdf/1507.03196.pdf.

A. Carlier, M. Danelljan, et al "DeepSVG: A Hierarchical Generative Network for Vector Graphics Animation" arXiv:2007.11301, Year 2020 https://arxiv.org/pdf/2007.11301.pdf.

* cited by examiner

1200

Receiving An Indication Of A Source Font *1202*

Champagne Sorbet

Determining Font Embeddings And Glyph Metrics Embedding Of The Reference Glyph *1204*

$f^{loc}$   $f^{seq}$   $f^{met}$

Generating A Multi-Modal Vector *1206*

$$feat_{vec}^{model} = ([feat_{vec}^{seq}|feat_{vec}^{rast}|feat_{vec}^{loc}|feat_{vec}^{glyph}])$$

Identifying A Recommended Font Based On The Multi-Modal Vector *1208*

*Fig. 12*

GENERATING A MULTI-MODAL VECTOR REPRESENTING A SOURCE FONT AND IDENTIFYING A RECOMMENDED FONT UTILIZING A MULTI-MODAL FONT MACHINE-LEARNING MODEL

BACKGROUND

In the field of digital content editing, conventional font recommendation systems have developed various digital menus that present fonts and selection mechanisms for designers (or other users) to select fonts. For instance, conventional font recommendation systems sometimes present font recommendations to a user's computing device based on a font previously selected by the user. While conventional font recommendation systems provide some tools to aid in font selection, such conventional systems nevertheless demonstrate a number of technical disadvantages that limit the accuracy of recommending similar fonts to those selected by a user and limit the type of data upon which recommended fonts are based.

SUMMARY

This disclosure describes one or more embodiments of systems, computer-readable media, and methods that solve the foregoing problems and provide other benefits. In some cases, the disclosed system generates, utilizing a multi-modal font machine-learning model, a multi-modal vector representing different modalities of a source font and identifies a recommended font corresponding to the source font based on the multi-modal vector. In particular, the disclosed system can receive an indication of a source font and determine font embeddings for a reference glyph of the source font and a glyph metrics embedding for measurements of the reference glyph. Based on the font embeddings and the glyph metrics embedding, the disclosed system generates, utilizing the above-mentioned machine-learning model, a multi-modal vector representing the source font as a basis for identifying a recommended font corresponding to the source font. By capturing individual font characteristics from a vector outline, a raster image, glyph metrics, and/or other modalities in a multi-modal vector, the disclosed system more accurately and robustly generates font recommendations than existing font recommendation systems.

Additional features and advantages of one or more embodiments of the present disclosure are outlined in the description which follows, and in part will be obvious from the description, or may be learned by the practice of such embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 12 illustrates a flowchart of a series of acts for identifying and providing to a client device font recommendations based on a multi-modal vector in accordance with one or more embodiments.

DETAILED DESCRIPTION

Figure 1:
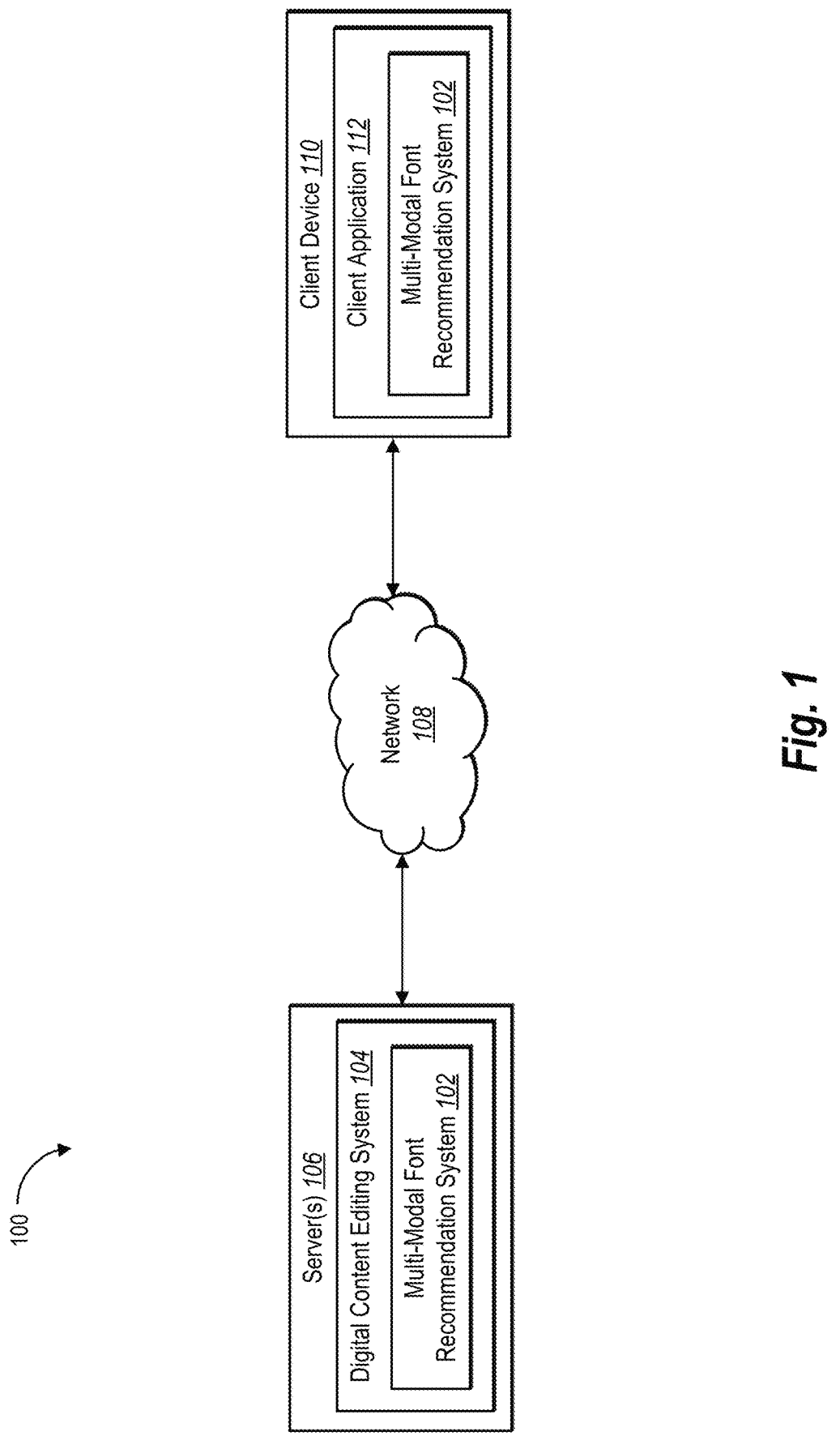
FIG. 1 illustrates an example environment in which a multi-modal font recommendation system operates in accordance with one or more embodiments.

This disclosure describes one or more embodiments of a multi-modal font recommendation system that can generate a multi-modal vector representing a source font indicated by a user client device and identify a recommended font corresponding to the source font based on the multi-modal vector. For example, in some embodiments, the multi-modal font recommendation system receives an indication of a source font from a computing device and determines font embeddings for one or more reference glyphs of the source font and a glyph metrics embedding for measurements of the one or more reference glyphs. Such embeddings capture subtle differences and nuances of the source font that the human eye can naturally catch but that computing devices struggle to detect and differentiate. By concatenating or otherwise combining the font embeddings and the glyph metrics embedding, the multi-modal font recommendation system generates, utilizing a multi-modal font machine-learning model, a multi-modal vector representing the source font. Such a multi-modal vector captures concrete and improved information regarding shapes and outlines from different modalities of the source font. Based on the multi-modal vector, the multi-modal font recommendation system identifies a recommended font corresponding to the source font.

As just mentioned above, the multi-modal font recommendation system determines font embeddings for one or more reference glyphs of a source font. In one or more embodiments, the multi-modal font recommendation system determines the font embeddings by determining both a sequence embedding and a visual structure embedding. In particular, the sequence embedding represents an outline of the reference glyph, and the visual structure embedding represents local points of the reference glyph.

To determine a sequence embedding as one of the font embeddings, in one or more embodiments, the multi-modal font recommendation system utilizes an outline sequence encoder to learn sequence aspect features of a font. In particular, the multi-modal font recommendation system utilizes the outline of a font, such as curves and concrete structural information and scale-invariant representations. To illustrate, the multi-modal font recommendation system generates the sequence embedding based on a rasterized image of the reference glyph and a vector outline of the reference glyph.

To determine the visual structure embedding as one of the font embeddings, in one or more embodiments, the multi-modal font recommendation system utilizes a local point encoder. In particular, the multi-modal font recommendation system generates, utilizing the local point encoder, a vector representing local shape descriptors. In some cases, the vector representing the local structure points includes invariant features of the reference glyph based on a rasterized image of the reference glyph. Furthermore, the multi-modal font recommendation system utilizes local shape descriptors to capture the font shapes at vertices and curvatures. Capturing the font shapes at vertices and curvatures enables local structural points, scale invariance, and rotation invariance for determining the visual structure embedding.

In addition to font embeddings, the multi-modal font recommendation system determines a glyph metrics embedding for measurements of a reference glyph by utilizing a glyph metrics analyzer. The glyph metrics are relevant and useful information within a font file either provided by a designer or rendered by a computing device. The parametric glyph metric values provide necessary information to typeset the font and impact the rendering and layout in the multi-modal vector. For instance, the multi-modal font recommendation system uses a glyph metrics analyzer to determine glyph metrics of one or more reference glyphs from metadata corresponding to the one or more reference glyphs and further normalizes, utilizing a metrics normalizer, the glyph metrics based on a distribution of glyph metrics. To illustrate example glyph metrics, in one or more implementations, the glyph metrics include at least one of a glyph width, a glyph height, a glyph ascender metric, a glyph descender metric, a lower-case height, an upper-case height, a units-per-em metric, a stem width, an average glyph contrast, or a stem angle.

Based on both the font embeddings and the glyph metrics embedding, in some cases, the multi-modal font recommendation system generates the multi-modal vector. In one or more embodiments, the multi-modal font recommendation system generates the multi-modal vector by using a multi-layer perceptron and by concatenating at least the font embeddings and the glyph metrics embedding. In some cases, the multi-modal font recommendation system generates the multi-modal vector by concatenating, utilizing the multi-layer perceptron, at least the sequence embedding, the visual structure embedding, and the glyph metrics embedding.

As mentioned above, the multi-modal font recommendation system identifies recommended fonts corresponding to the source font. Such recommendations can be altered or guided by user input. In one or more embodiments, for example, the multi-modal font recommendation system identifies natural language processing (NLP) tags based on user input identifying fonts to include or exclude from recommendations. In some implementations, the NLP tags classify glyphs of candidate fonts for selection as recommended fonts and can be used to filter candidate fonts to a subset of candidate fonts from which a recommended font is selected. To illustrate, in some cases, the multi-modal font recommendation system identifies, from the subset of candidate fonts, the recommended font corresponding to the source font based on the multi-modal vector.

Moreover, in one or more embodiments, the multi-modal font recommendation system identifies a recommended font by utilizing a cosine similarity model. In particular, the multi-modal font recommendation system determines, utilizing the cosine similarity model, cosine similarities between the multi-modal vector and candidate font vectors for candidate fonts. From among the candidate font vectors, for instance, the multi-modal font recommendation system determines a recommended font vector corresponding to a highest cosine similarity and selects a recommended font corresponding to the recommended font vector.

As indicated above, the multi-modal font recommendation system provides several advantages over conventional font recommendation systems. For example, conventional systems suffer from several technological shortcomings that result in inaccurate identification of fonts for recommendation to a user. Conventional recommendation systems often fail to operate accurately. For example, many conventional font systems recommend fonts based on rigid and limited computing models. In some such cases, conventional systems utilize raster impression of a previously selected font with a neural network to learn about font features. By using a rasterized version of a font only as a basis for font features, conventional systems often provide a user/designer's computing device with recommended fonts that often fail to adapt to a designer's desired aesthetics and fails to capture nuances of a previously selected font features. Because conventional font recommendation systems often recommend dissimilar fonts, users of conventional systems often scroll through a plurality of fonts before locating an ideal font for their project.

Many conventional font recommendation systems recommend dissimilar fonts because they rely on font tags or limited information from rasterized-font images as bases for font recommendations. In some such cases, designers rely on the typographic text object's properties where a font is used for the font tags, which is highly subjective and as a result, the use of font tags returns inaccurate and inconsistent results. Moreover, in other cases, conventional systems merely rely on the above-mentioned raster impression of a font, which also results in inaccurate and inconsistent results.

As alluded to above, unlike conventional systems, the multi-modal font recommendation system generates a multi-modal vector and more accurately locates recommended fonts similar to a source font indicated by a user's computing device. In particular, the multi-modal font recommendation system generates a multi-modal vector utilizing a multi-modal font machine learning model that represents the source font based on one or more of the above-mentioned embeddings. The use of the multi-modal vector surfaces better and more accurate font recommendations that conform to a user/designer's aesthetic and artistic purposes as reflected in a source font. For example, the font embeddings utilized by the multi-modal font recommendation system capture details of the font, such as curves, structural information, scale-invariant information, the vector outline, and local shape descriptors. Furthermore, the glyph metrics embedding utilized by the multi-modal font recommendation system captures additional nuanced details, such as width, height, ascender, descender, x-Height, cap height, units per Em square, stem width, average glyph contrast, and stem angle. As such, users/designers in the multi-modal font recommendation system do not have to rely on merely rasterized based impressions of the font for inconsistent results. As is described below, the multi-modal font recommendation system utilizes the multi-modal font machine-learning model that is both more consistent and accurate at identifying recommended fonts with characteristics similar to a source font than conventional systems.

Furthermore, the multi-modal font recommendation system more accurately generates similar fonts as recommendations and accounts for different characteristics of a source font than conventional font recommendation systems. For example, by determining font embeddings for a reference glyph of a source font indicated by a user's computing device and a glyph metrics embedding for measurements of the reference glyph, the multi-modal font recommendation system combines such embeddings into a multi-modal vector for a source font that differentiates between subtle variations in fonts. As a result of such a multi-modal vector, users/designers of the multi-modal font recommendation system are not required to scroll through numerous font recommendations before finding a similar font to the source font. Rather, the multi-modal font recommendation system can select one or more recommended fonts—based on a multi-modal vector—that quickly captures similarities of a source font in a single graphical user interface.

In addition to the multi-modal font recommendation system improving upon accuracy as compared to conventional systems, in some embodiments, the multi-modal font recommendation system implements a first-of-its-kind machine learning model that generates a multi-modal vector that represents a source font and accounts for different modalities of the source font as a basis for identifying recommended font(s). Such different modalities include glyph metrics for the source font that previous systems have not used as a basis for feature embeddings. In particular, this first-of-its-kind machine learning model contributes to determining subtle nuances and features of a reference glyph of a source font that other font-based machine learning models are unable to accomplish or process. Specifically, this first-of-its-kind machine learning model determines glyph metrics by utilizing a glyph metrics analyzer. As part of a larger machine-learning model, the glyph metrics analyzer is distinct from predecessor models, which merely utilize rasterized based images of the font.

Furthermore, the combination/concatenation of font embeddings and the glyph metrics embedding are also a first-of-its-kind in the machine learning model space for identifying recommended fonts. In particular, the multi-modal font recommendation system determines the just mentioned embeddings and generates the multi-modal vector. Accordingly, the use of i) glyph metrics, ii) the glyph metrics analyzer, and iii) the multi-modal vector implemented within a machine learning model are all first-of-its-kind in the machine learning space for font recommendations.

Additional detail regarding the multi-modal font recommendation system will now be provided with reference to the figures. For example, FIG. 1 illustrates a schematic diagram of an exemplary system 100 in which multi-modal font recommendation system 102 operates. As illustrated in FIG. 1, the system 100 includes a server(s) 106, a network 108, and client device 110.

Although the system 100 of FIG. 1 is depicted as having a particular number of components, the system 100 is capable of having any number of additional or alternative components (e.g., any number of servers, client devices, or other components in communication with the multi-modal font recommendation system 102 via the network 108). Similarly, although FIG. 1 illustrates a particular arrangement of the server(s) 106, the network 108, and the client device 110, various additional arrangements are possible.

The server(s) 106, the network 108, and the client device 110 are communicatively coupled with each other either directly or indirectly (e.g., through the network 108 discussed in greater detail below in relation to FIG. 11). Moreover, the server(s) 106 and the client device 110 include one or more of a variety of computing devices (including one or more computing devices as discussed in greater detail with relation to FIG. 11).

As mentioned above, the system 100 includes the server(s) 106. In one or more embodiments, the server(s) 106 generates, stores, receives, and/or transmits data including models, digital content, and recommendations for application features. In one or more embodiments, the server(s) 106 comprises a data server. In some implementations, the server(s) 106 comprises a communication server or a web-hosting server.

In one or more embodiments, the client device 110 includes computing devices that can access, edit, segment, modify, store, and/or provide for display fonts. For example, the client device 110 include smartphones, tablets, desktop computers, laptop computers, head-mounted-display devices, or other electronic devices. The client device 110 includes one or more applications (e.g., the client application 112) that can access, edit, segment, modify, store, and/or provide recommendations for fonts. For example, in one or more embodiments, the client application 112 includes a software application installed on the client device 110. Additionally, or alternatively, the client application 112 includes a software application hosted on the server(s) 106, which may be accessed by the client device 110 through another application, such as a web browser.

To provide an example implementation, in some embodiments, the multi-modal font recommendation system 102 on the server(s) 106 supports a digital-content-editing system 104 on the client device 110. For instance, in some cases, the digital-content-editing system 104 on the server(s) 106 gathers input data for the multi-modal font recommendation system 102. The multi-modal font recommendation system 102 then, via the server(s) 106, provides the multi-modal font recommendation system 102 to the client device 110. In other words, the client device 110 obtains (e.g., downloads) the multi-modal font recommendation system 102 from the server(s) 106. Once downloaded, the multi-modal font recommendation system 102 on the client device 110 generates the multi-modal vector and identifies font recommendations for a user of the client device 110.

In alternative implementations, the multi-modal font recommendation system 102 includes a web hosting application that allows the client device 110 to interact with content and services hosted on the server(s) 106. To illustrate, in one or more implementations, the client device 110 accesses a software application supported by the server(s) 106. In response, the multi-modal font recommendation system 102 on the server(s) 106 generates and provides one or more recommendations for fonts. The server(s) 106 then provide the font recommendations to the client device 110 for display and selection.

Indeed, the multi-modal font recommendation system 102 is able to be implemented in whole, or in part, by the individual elements of the system 100. Indeed, although FIG. 1 illustrates the multi-modal font recommendation system 102 implemented with regard to the server(s) 106, different components of the multi-modal font recommendation system 102 are able to be implemented by a variety of devices within the system 100. For example, one or more (or all) components of the multi-modal font recommendation system 102 are implemented by a different computing device (e.g., the client device 110) or a separate server from the server(s) 106. Indeed, as shown in FIG. 1, the client device 110 includes the multi-modal font recommendation system 102. Example components of the multi-modal font recommendation system 102 will be described below with regard to FIG. 11.

Figure 2A:
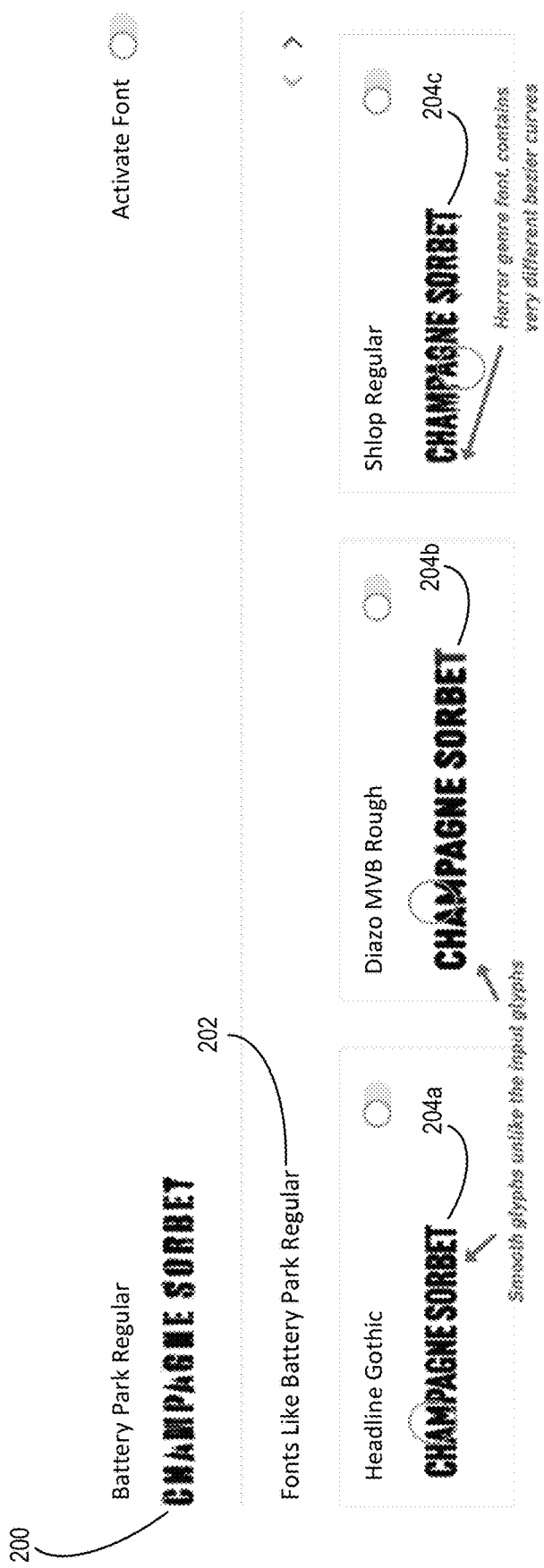
FIGS. 2A-2B illustrates example graphical user interfaces of the multi-modal font recommendation system identifying recommended fonts corresponding to a source font in accordance with one or more embodiments.
Figure 2B:
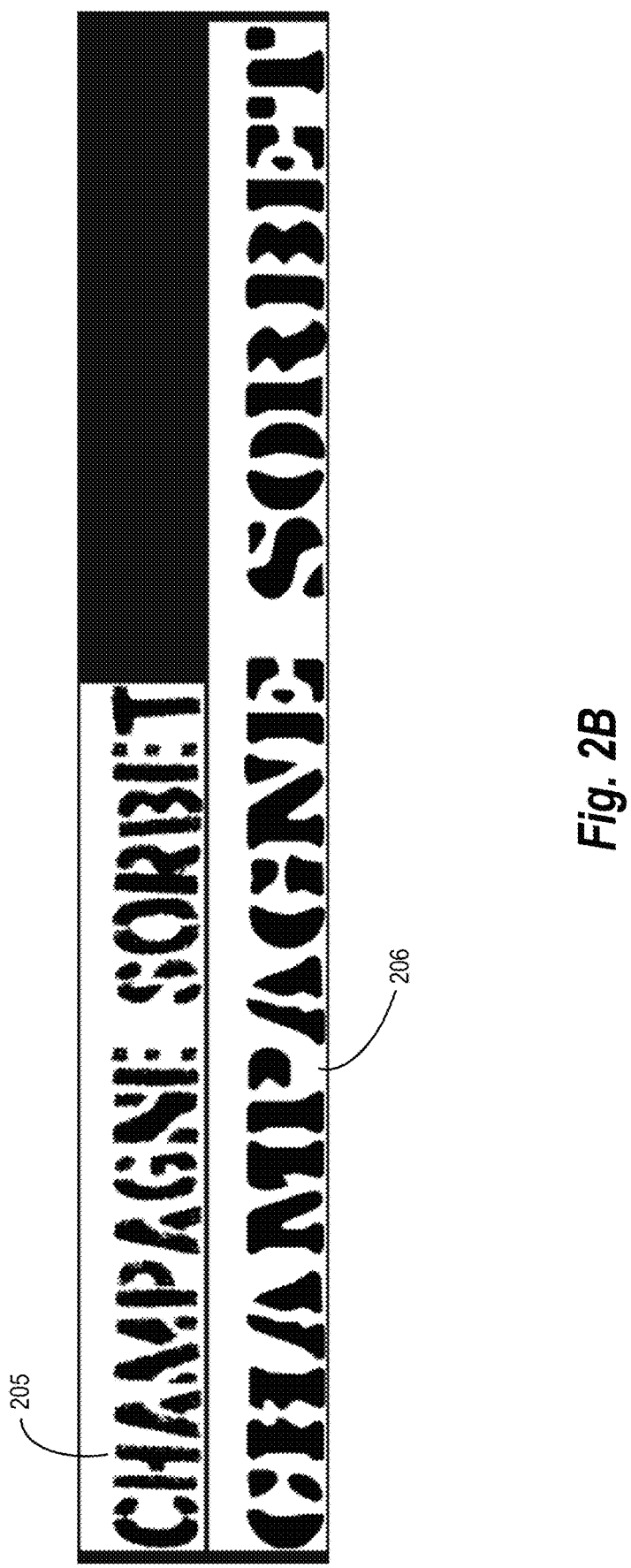

As mentioned above, the multi-modal font recommendation system 102 improves recommended fonts as compared to conventional font recommendation systems. For example, FIGS. 2A-2B illustrate embodiments of recommended fonts generated from conventional font recommendation systems and recommended fonts generated from the multi-modal font recommendation system 102. In particular, FIGS. 2A-2B show an overview of the recommended fonts displayed on a graphical user interface for a user and marked improvements of recommended fonts by the multi-modal font recommendation system 102 over conventional systems.

As shown in FIG. 2A, the figure illustrates font recommendations of a conventional font recommendation system for an input font. For example, FIG. 2A shows an input source font 200 and a recommendation message 202 identifying recommended fonts for the input source font 200. In particular, FIG. 2A shows the input source font 200 of "Battery Park Regular" and the recommendation message 202 identifies recommended fonts like "Battery Park Regular." To illustrate, FIG. 2A shows conventional font recommendation systems generating a couple of recommendations. For example, FIG. 2A shows the conventional font recommendation systems recommending a first recommended font 204a of "Headline Gothic ATF Rough NO.1," a second recommended font 204b of "Diazo MVB Rough Ex Cond Black," and a third recommended font 204c of "Shlop Regular." In one or more embodiments, a font is a set of particular styles of a typeface for a collection of characters. A font can include a combination of a typeface and other stylistic qualities for a collection of characters, such as pitch, spacing, and size.

As just mentioned, FIG. 2A shows recommended fonts from a conventional font recommendation system. For example, the first recommended font 204a shows a problem with conventional font recommendation systems. In particular, the first recommended font 204a shows smooth glyphs, whereas the input font "Battery Park Regular" shows faded glyphs. Furthermore, the second recommended font 204b also shows smooth glyphs. FIG. 2A also illustrates the third recommended font 204c, where the third recommended font 204c shows a horror genre font. Accordingly, FIG. 2A illustrates that conventional font recommendation systems generate font recommendations that are dissimilar to the input source font 200.

In one or more embodiments, a glyph is a pictorial representation of a character using one or more specific shapes. In particular, a glyph can include a specific shape, design, or representation of a character. Indeed, various types of glyphs (within a single font type) can represent a specific character. To provide but one example, to differentiate fonts from glyphs, a font can include Myriad Pro Regular and a glyph can include, but is not limited to, accented glyphs, Latin glyphs, or Greek glyphs for the font Myriad Pro Regular. Relatedly, in one or more embodiments, a character is a single textual or written element, such as a letter, numeral, or mark of punctuation.

Moving on from the depiction of conventional font recommendation systems, FIG. 2B shows recommendations for fonts in the multi-modal font recommendation system 102. For example, FIG. 2B shows for the input source font 200 of "Battery Park Regular" (discussed above) a fourth recommendation font 205 and a fifth recommendation font 206. In particular, FIG. 2B shows the fourth recommendation font 205 and the fifth recommendation font 206 resulting in a visibly more similar font than the fonts shown in FIG. 2A (recommendation fonts 204a-204c). For instance, the fourth recommendation font 205 shows similar gaps but varies slightly from the input source font 200 (e.g., see "A" and "G" of the fourth recommendation font 205 as compared to the input source font 200). Further, the fifth recommendation font 206 shows similar gaps between individual characters and has a similar appearance for the fonts and the glyphs. Accordingly, FIGS. 2A and 2B illustrate improved accuracy in the multi-modal font recommendation system 102 over conventional font recommendation systems.

Figure 3:
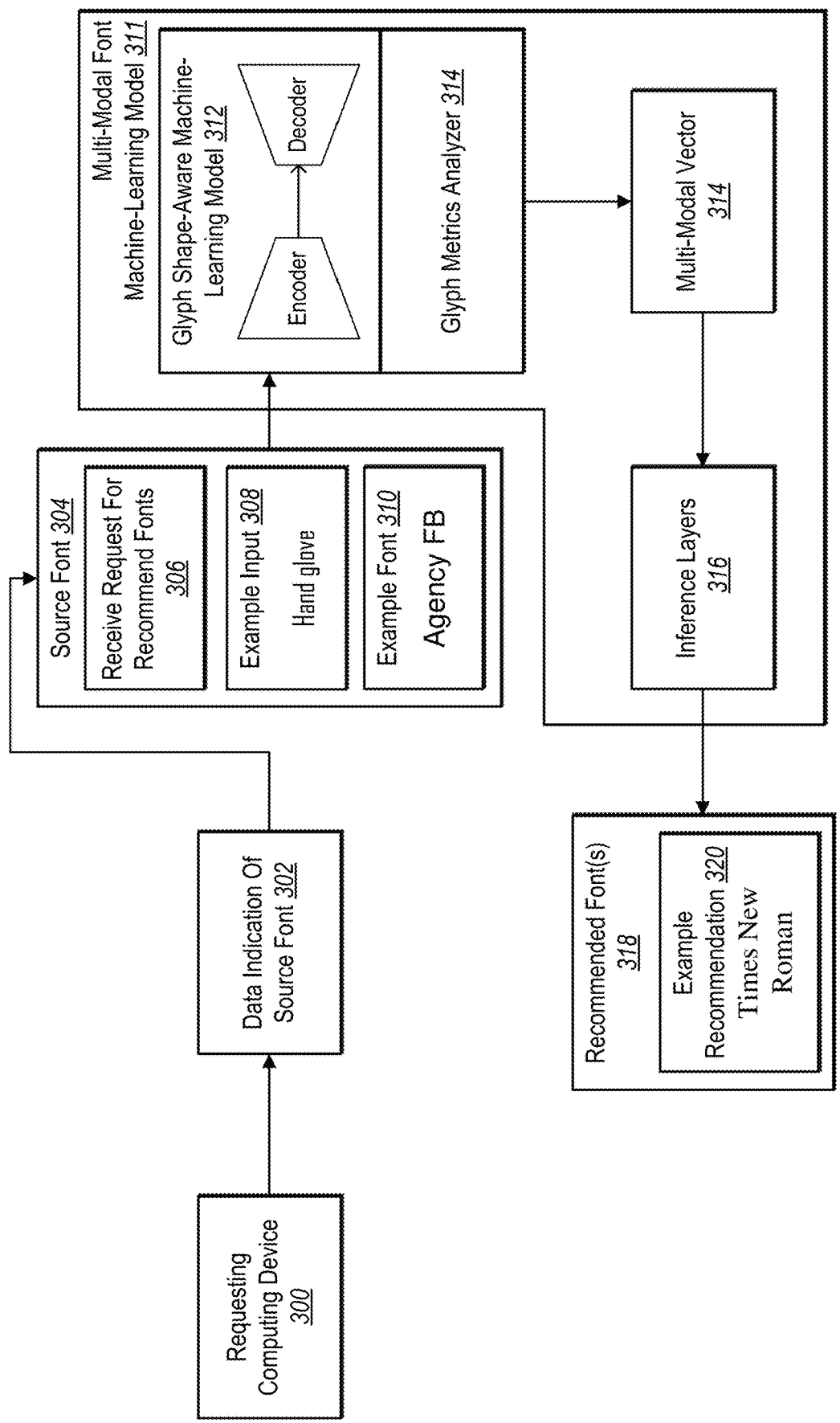
FIG. 3 illustrates an example diagram of the multi-modal font recommendation system receiving a data indication of a source font and utilizing a multi-modal font machine-learning model generate a multi-modal vector in accordance with one or more embodiments.

As mentioned above, the multi-modal font recommendation system 102 generates a multi-modal vector. In accordance with one or more embodiments, FIG. 3 shows an example flow diagram of the multi-modal font recommendation system 102 receiving a data indication of a source font, generating a multi-modal vector representing the source font, and identifying recommended fonts based on the multi-model vector. FIG. 3 accordingly provides a brief overview of one or more embodiments of actions performed by the multi-modal font recommendation system 102.

For example, FIG. 3 illustrates the multi-modal font recommendation system 102 performing an act 302 of receiving a data indication of a source font from a requesting computing device 300. As shown, the requesting computing device 300 sends a data indication of a source font to the multi-modal font recommendation system 102. In particular, the requesting computing device 300 includes any client device, server, or third-party computing device discussed previously in relation to FIG. 1.

As just mentioned above, the multi-modal font recommendation system 102 performs the act 302 of receiving the data indication of the source font. For example, based on the act 302 of receiving the data indication of the source font, the multi-modal font recommendation system 102 determines recommended fonts for the requesting computing device 300. In particular, the multi-modal font recommendation system 102 performs the act 302 in a variety of methods. To illustrate, the multi-modal font recommendation system 102 can detect or receive data indications in the form of i) a client device selection, ii) automatic detection (e.g., hover or screen depiction of a source font), or iii) based on a client device utilizing a certain feature.

In one or more embodiments, the multi-modal font recommendation system 102 receives an indication from the client device to provide font recommendations. In particular, the multi-modal font recommendation system 102 receives an express indication from the client device in addition to selecting a font for the multi-modal font recommendation system 102 to provide font recommendations. To illustrate, the client device selects an option that reads "provide similar font recommendations."

In one or more embodiments, the multi-modal font recommendation system 102 identifies recommended fonts based on a user selection. In particular, a client device selects a font for use within a client application and the multi-modal font recommendation system 102 utilizes the selected font from the client device to identify recommended fonts. To illustrate, a client device selects the font "Manicotti Regular" and the multi-modal font recommendation system 102 automatically suggests additional font options for similar fonts.

In one or more embodiments, the multi-modal font recommendation system 102 identifies font recommendations for a client device in response to the client device selecting or utilizing certain features of a particular font. In particular, based on a client device utilizing pre-established features within a client application, the multi-modal font recommendation system 102 surfaces font recommendations on a display of the graphical user interface for the client device to potentially utilize. To illustrate, in response to a client device selecting a feature, such as bolding, italicizing, or changing the font size, the multi-modal font recommendation system 102 identifies recommended fonts.

As mentioned above, the multi-modal font recommendation system 102 receives the data indication of the source font. For example, the data indication of the source font includes receiving an input glyph corresponding to the source font. As a reminder, a glyph differs from a font, where a glyph is a pictorial representation of a character, and a font is a set of particular styles of a typeface for a collection of characters. A font can include a combination of a typeface and other stylistic qualities for a collection of characters, such as pitch, spacing, and size. In particular, the multi-modal font recommendation system 102 performs the act 302 of receiving the data indication of the source font including one or more glyphs.

In one or more embodiments, the multi-modal font recommendation system 102 via a glyph shape-aware machine-learning model 312 receives a single input glyph. In particular, the single input glyph corresponds with a source font 304. In one or more embodiments, the glyph shape-aware machine-learning model 312 receives multiple input glyphs. In particular, the glyph shape-aware machine-learning model 312 receives at least one upper-case glyph and one lower-case glyph corresponding to the source font 304. In one or more embodiments, the glyph shape-aware machine-learning model 312 receives one or more input glyph(s) and a source font file. In particular, the glyph shape-aware machine-learning model 312 receives the source font file with metadata, which includes data for further processing e.g., the glyph metrics.

As further shown in FIG. 3, the multi-modal font recommendation system 102 via the glyph shape-aware machine-learning model 312 receives the source font 304 with a request for recommended fonts 306. In one or more embodiments, the source font 304 is a point of reference font. In particular, the source font 304 includes a user selecting a font as a point of reference and the multi-modal font recommendation system 102 determining additional fonts based on the source font 304. As previously discussed, and illustrated, a computing device may detect a user selection of "Manicott Regular" as the source font 304, and the multi-modal font recommendation system 102 identifies additional similar fonts.

Additionally, FIG. 3 also illustrates an example input 308 and an example font 310. In particular, the example input 308 includes the text "Hand glove" and the example font 310 includes "Agency FB." For instance, as shown in FIG. 3, the multi-modal font recommendation system 102 receives the source font 304 that includes the example input 308, the request for recommended fonts 306, and the example font 310 to further determine recommended font(s) 318.

As further shown in FIG. 3, the multi-modal font recommendation system 102 inputs data representing different modalities of the source font 304 into a multi-modal font machine-learning model 311. In accordance with one or more embodiments, the multi-modal font machine-learning model 311 comprises both a glyph shape-aware machine-learning model 312 and a glyphs metrics analyzer 313.

As further indicated by FIG. 3 and described further below, the glyph shape-aware machine-learning model 312 includes two constituent parts, I) one part generates the sequence embedding and II) the second part generates the visual structure embedding. Both the sequencing embedding and the visual structure embedding represent different modalities of the source font 304.

In one or more embodiments, a machine learning model is a model that utilizes algorithms to learn from, and make predictions on, known data by analyzing the known data to learn to generate outputs that reflect patterns and attributes of the known data. For instance, in some instances, a machine learning model includes, but is not limited to a neural network (e.g., a convolutional neural network, recurrent neural network or other deep learning network), a decision tree (e.g., a gradient boosted decision tree), association rule learning, inductive logic programming, support vector learning, Bayesian network, regression-based model (e.g., censored regression), principal component analysis, or a combination thereof As mentioned previously, the glyph shape-aware machine-learning model 312 includes two constituent parts, I) one part generates the sequence embedding and II) the second part generates the visual structure embedding. In one or more embodiments, for the first constituent part of the glyph shape-aware machine-learning model 312, the glyph shape-aware machine-learning model 312 receives as inputs, outlines of the font. In particular, for generating as an output the sequence embedding, the glyph shape-aware machine-learning model 312 utilizes sequence aspect features as inputs. To illustrate, sequence aspect features include handwritten fonts with curves, formal font structural info, and scale-invariant representations. Additionally, the sequence embedding of the glyph shape-aware machine-learning model 312 also includes vector outlines e.g., curves, lines, open/closed paths for local regions.

In one or more embodiments, the term "vector outline" (sometimes referred to as outline or vector format) is a vector-based representation of one or more characters. In particular, a vector outline can include a vector-based representation of one or more paths described in terms of a collection of closed Bezier splines (or curves). A vector outline can include a set of anchor points connected via lines and/or curves (e.g., Bezier splines or curves) to form one or more paths representing one or more glyphs and/or characters (e.g., any variety of printed and/or written letters, numbers, and/or symbols). In some embodiments, an image, PDF, SVG, and/or EPS file can include a vector outline (e.g., a vector outline in Bezier form). More details for the machine learning model that generates the sequence embedding is given in FIG. 4B.

In one or more embodiments, the term "line" (sometimes referred to as "vector line") includes a geometrical object that connects two anchor points within a vector outline without forming a curve. Furthermore, in one or more embodiments, the term "curve" (sometimes referred to as "vector curve") includes a geometrical object that connects two anchor points within a vector outline to represent (or form) a deviation from a straight line between the two anchor points. Further, in one or more embodiments the term "anchor point" includes an object that marks the end of a line segment and/or a curve segment within a vector outline (e.g., Bezier control points). In addition, in one or more embodiments, the term "path" (sometimes referred to as a closed path) includes an enclosed area formed by lines, curves, anchor points, and/or any combination thereof. Indeed, a path can include a geometrical object that is portrayed by a connection of one or more lines and/or one or more curves using one or more anchor points.

As further indicated by FIG. 3, in some embodiments, the second constituent part of the glyph shape-aware machine-learning model 312 utilizes a scale invariant feature transform (SIFT). For example, for the visual structure embedding, the glyph shape-aware machine-learning model 312 receives font shapes at vertices and curvatures. In particular, the shape parameters allow for enabling local structural points, scale invariance, and rotation invariance. To illustrate, SIFT captures unique aspects of input glyph(s) that are more granular and unique to a glyph. More details concerning SIFT are given in FIG. 4C.

As further indicated by FIG. 3 and described further below, the glyphs metrics analyzer 313 determines glyph metrics of one or more reference glyphs from the source font 304. In some cases, the glyphs metrics analyzer 313 further utilizes a metrics normalizer to normalizes the glyph metrics. The multi-modal font recommendation system 102 further embeds the normalized glyph metrics into a glyph metrics embedding. The glyph metrics embedding represents another modality of the source font 304.

As also shown in FIG. 3 and as mentioned above, the multi-modal font recommendation system 102 via the multi-modal font machine-learning model 311 generates a multi-modal vector 314. In one or more embodiments, the multi-modal vector 314 includes a vector based on at least three distinctive representations. In particular, the at least three distinctive representations include i) sequence embedding ii) visual structure embedding and iii) glyph metrics embedding. For instance, based on the just-mentioned embeddings, the multi-modal vector 314 contributes to the multi-modal font recommendation system 102 identifying recommended fonts on a more nuanced basis and capturing more in-depth details for the structure of the glyph(s), character(s), and font. Furthermore, the multi-modal vector 314 improves upon conventional systems that merely utilize a rasterized image of the font. More details of the multi-modal vector are given in FIG. 4A.

Further, FIG. 3 shows the multi-modal font recommendation system 102 further analyzing the multi-modal vector 314 via inference layers 316. Specifically, the inference layers 316 assist in generating an output for identifying recommended font(s) 318. In particular, the glyph shape-aware machine-learning model 312 passes the multi-modal vector 314 through additional layers (e.g., the inference layers 316) for further processing to ultimately identify recommended font(s) 318. The additional processing is further discussed in relation to FIG. 8.

In one or more embodiments, the recommended font(s) 318 constitute one or more fonts the multi-modal font recommendation system 102 surfaces as most similar to (or the same as) the source font 304. In particular, the recommended font(s) 318 includes i) a font different from the source font 304 or ii) one of the fonts being the same as the source font 304. To illustrate, the second scenario of the recommended font(s) being the same as the source font 304, occurs if the multi-modal font recommendation system 102 does not identify any fonts that correspond with the source font 304 for similarity. Furthermore, the recommended font(s) 318 includes any font from a plurality of fonts that has a vector value closest to the multi-modal vector or other vector representing the source font. As is shown in FIG. 3, the multi-modal font recommendation system 102 identifies an example recommendation 320 for the recommended font(s) 318 as "Times New Roman." More details for identifying the recommended font(s) 318 is given in FIGS. 4A and 7.

Figure 4A:
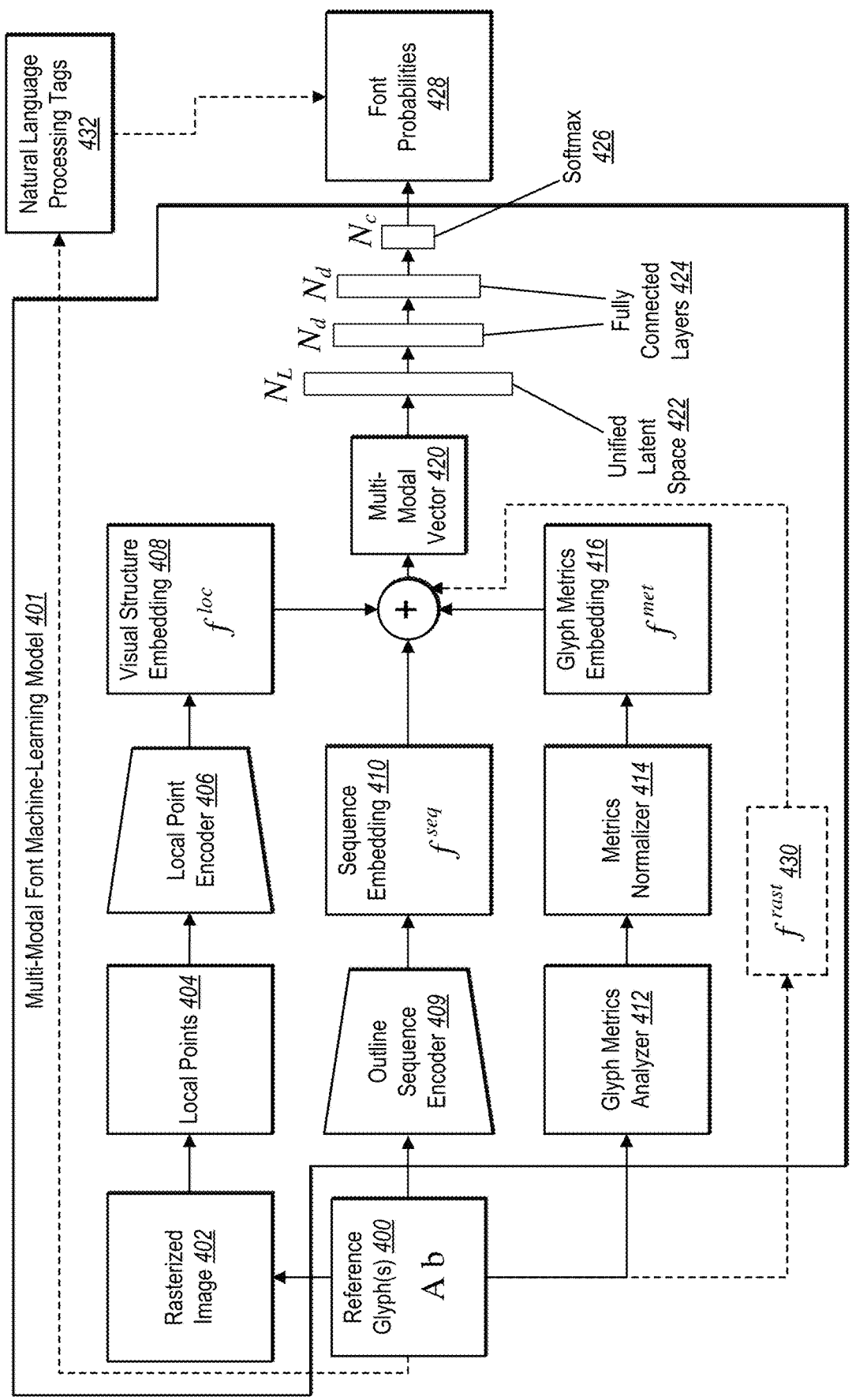
FIGS. 4A-4C illustrates example diagrams of the multi-modal font recommendation system utilizing a multi-modal font machine-learning model to generate font embeddings and a glyph metrics embedding concatenated into a multi-modal vector representing a source font and determine a recommended font based on the source font in accordance with one or more embodiments.
Figure 4B:
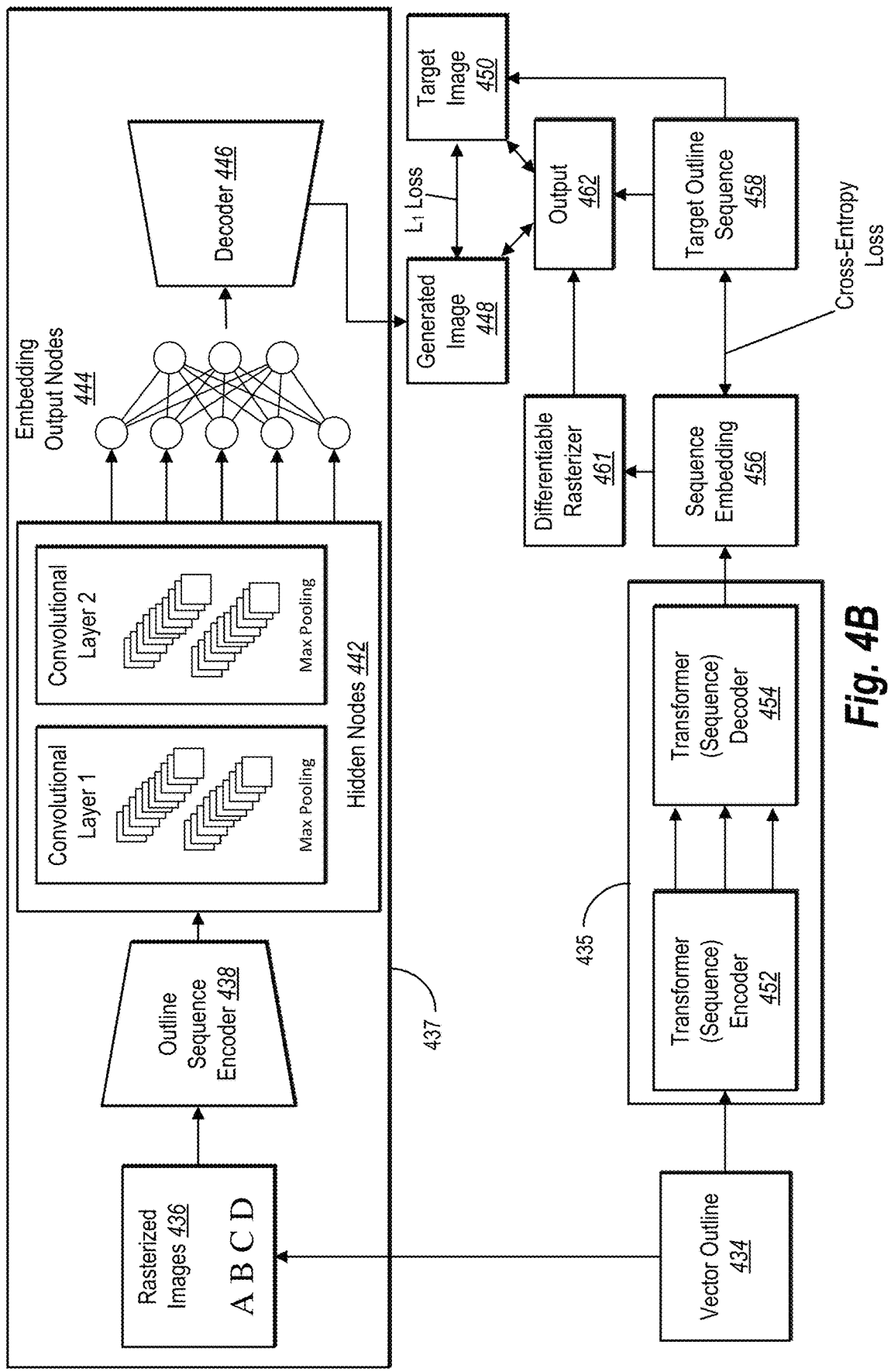
Figure 4C:
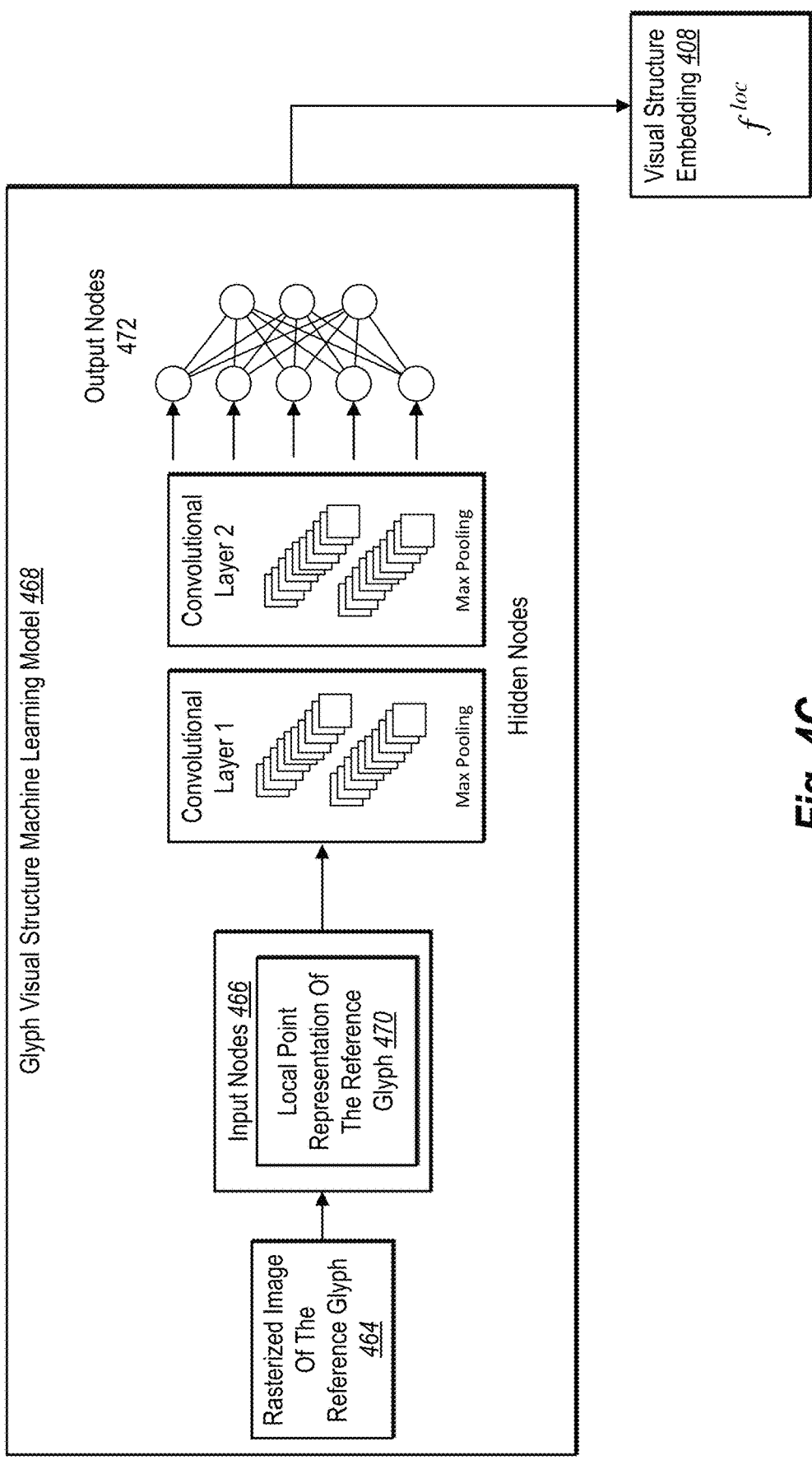

As mentioned above, FIGS. 4A-4C illustrate the multi-modal font recommendation system 102 utilizing a multi-modal font machine-learning model to (i) generate font embeddings and a glyph metrics embedding—concatenated into a multi-modal vector—to represent a source font and (ii) determine a recommended font based on the multi-modal vector in accordance with one or more embodiments. In particular, FIG. 4A shows a multi-modal font machine learning model 401 that includes a glyph shape-aware machine-learning model with a glyph metrics analyzer 412 to generate a multi-modal vector 420 concatenated from a plurality of embeddings. FIG. 4B shows an example model architecture for an outline sequence encoder and other machine-learning model layers generating a sequence embedding 410. FIG. 4C shows an example model architecture for a local point encoder and other machine-learning model layers generating a visual structure embedding 408.

As shown in FIG. 4A, the multi-modal font recommendation system 102 inputs data representing reference glyph(s) 400 for a source font into the multi-modal font machine-learning model 401. As already discussed, the multi-modal font recommendation system 102 via the multi-modal font machine-learning model 401 receives one or more input glyph(s). In particular, FIG. 4A shows the multi-modal font machine-learning model 401 receiving an upper-case and lower-case input glyph. To illustrate, upon receiving the one or more input glyph(s), the multi-modal font machine-learning model 401 analyzes the received information to generate the multi-modal vector 420.

As illustrated by FIG. 4A, the multi-modal font machine-learning model 401 comprises three branches. For example, in FIG. 4A, the branch of the multi-modal font machine-learning model 401 that generates the visual structure embedding 408 includes a rasterized image 402, local points 404, and a local point encoder 406. Further, the branch of the multi-modal font machine-learning model 401 that generates the sequence embedding 410 includes the reference glyph(s) 400 and outline sequence encoder 409. Additionally, the branch of the multi-modal font machine-learning model 401 that generates a glyph metrics embedding 416 includes the glyph metrics analyzer 412 and a metrics normalizer 414.

The following paragraphs describe the visual structure embedding 408 (e.g., a SIFT embedding) followed by the sequence embedding 410 and the glyph metrics embedding 416 as intermediate outputs of the multi-modal font machine-learning model 401. SIFT provides several unique advantages. As mentioned above, a SIFT identifies local points that represent distinctive points and are obtained by assembling high-dimensional vectors representing the image gradients within a local region of an of image of a glyph. For example, SIFT provides several advantages, such as identifying local points invariant to image rotation. In particular, SIFT utilizes points in an image of a glyph that scale and are robust across a substantial range of distortion, noise addition, and change in illumination. To illustrate, for SIFT, large numbers of local points can be extracted from images adding to the robustness for extracting small objects among cluttered images. Small local points available for matching small and highly occluded objects and large local points perform well for images subject to noise and blur.

As further shown in FIG. 4A, based on the reference glyph(s) 400, a SIFT branch of the multi-modal font machine-learning model 401—including the local point encoder 406—receives the rasterized image 402. In one or more embodiments, the rasterized image 402 is a two-dimensional image. In particular, the two-dimensional image includes a rectangular matrix or grid of square pixels viewable via a graphical user interface of a computing device. To illustrate, in some cases, rasterized images are stored as image files and are viewable to a user of the computing device. Furthermore, as further shown in FIG. 4A, the multi-modal font recommendation system 102 uses the rasterized image 402 of the reference glyph(s) 400 to compute the local points 404.

In one or more embodiments, the multi-modal font recommendation system 102 computes the local points 404 from the rasterized image 402. In particular, in one or more embodiments, local points comprise or constitute keypoints, where the keypoints represent distinctive points within an image. For instance, a local point includes a circular image region with an orientation within an image and is described by "x" and "y" coordinates, radius of the image region, and orientation (e.g., an angle expressed in radians).

As also shown in FIG. 4A, the multi-modal font machine-learning model 401 encodes local points in the local point encoder 406. In one or more embodiments, an encoder is a neural network (or one or more layers of a neural network) that extract features relating from fonts, e.g., in this instance relating to local points of the rasterized image. In some cases, an encoder refers to a neural network that both extracts and encodes features from a local points into a visual structure embedding. For example, an encoder can include a particular number of layers including one or more fully connected and/or partially connected layers of neurons that identify and represent visible and/or unobservable characteristics of local points.

Based on the encoding of the local points 404 by the local point encoder 406, as further shown in FIG. 4A, the SIFT branch of the multi-modal font machine-learning model 401 generates the visual structure embedding 408. In particular, FIG. 4A illustrates the visual structure embedding as $f^{loc}$. In one or more embodiments, a vector is a representation of objects in a numerical computer-readable way. Furthermore, in some embodiments, an embedding constitutes a low-dimensional vector representation for high-dimensional vectors. Vector embeddings allow machine-learning models to operate more efficiently. Accordingly, in some embodiments, the visual structure embedding 408 is a numerical representation of the visual structure of one or more of the reference glyph(s) 400. More details and the specific architecture components of the SIFT branch of the multi-modal font machine-learning model are discussed in more detail in FIG. 4C.

As also shown in FIG. 4A, an outline sequence encoder 409 receives one or more of the reference glyph(s) 400 to generate the sequence embedding 410. In one or more embodiments, the sequence embedding 410 provides the multi-modal font recommendation system 102 more context for identifying sequence aspect features (discussed above). In particular, the sequence aspect features are based on information, such as the vector outline (discussed above, e.g., unstructured representations such as curves, lines, and open/closed paths). To illustrate, the multi-modal font machine-learning model 401 encodes outline sequence information with the outline sequence encoder 409 (based on the same principles discussed above in relation to the local point encoder). Moreover, in response to encoding the outline sequence information, the multi-modal font machine-learning model 401 generates the sequence embedding 410. In particular, FIG. 4A shows the sequence embedding 410 as $f^{seq}$. This disclosure further describes the branch of the multi-modal font machine-learning model 401 for generating the sequence embedding 410 and specific details for the model architecture are also further described below with respect to FIG. 4B.

Moving on from the first two branches, the multi-modal font recommendation system 102 also receives, via a glyph metrics analyzer 412, the reference glyph(s) 400. For example, the multi-modal font recommendation system 102 obtains glyph metrics from the received reference glyph(s) 400 via the glyph metrics analyzer 412. In some embodiments, glyph metrics are relevant and useful information within a font file or within the metadata of a font file. To illustrate, the multi-modal font recommendation system 102 either i) directly receives the glyph metrics corresponding with the source font from the reference glyph(s) 400 or ii) the multi-modal font recommendation system 102 renders the glyph metrics from the source font and determines the glyph metrics.

In one or more embodiments, the multi-modal font recommendation system 102 renders the glyph metrics. In particular, the multi-modal font recommendation system 102 normalizes the received reference glyph(s) based on a bounding box of the reference glyph(s) 400. For instance, based on the bounding box, the multi-modal font recommendation system 102 normalizes different metrics of the reference glyph(s) 400.

In one or more embodiments, the glyph metrics provide information for typesetting font, such as rendering and layout of fonts, for which the multi-modal font recommendation system 102 utilizes in the glyph metrics embedding. In particular, as already mentioned, glyph metrics include one or more of a glyph width, a glyph height, a glyph ascender metric, a glyph descender metric, a lower-case height, an upper-case height, a units-per-em metric, a stem width, an average glyph contrast, or a stem angle. Each of these terms are discussed in more detail below in the description of FIGS. 5A-5B. As also illustrated, FIG. 4A shows the metrics normalizer 414. For example, the metrics normalizer 414 normalizes the above-discussed glyph metrics to generate the glyph metrics embedding 416 ($f^{met}$). The glyph metrics embedding 416 is discussed in more detail below in FIG. 5C.

As further mentioned above, the multi-modal font recommendation system 102 concatenates various embeddings. As illustrated, FIG. 4A shows the multi-modal font recommendation system 102 concatenating at least the visual structure embedding 408, the sequence embedding 410, and the glyph metrics embedding 416. For instance, in one or more embodiments, the concatenation of the embeddings includes hundreds or thousands of values. This disclosure describes the concatenated values in more detail below with respect to FIG. 6.

In addition to generating the multi-modal vector 420, as further shown in FIG. 4A, multiple layers of the multi-modal font machine-learning model 401 further process the multi-modal vector 420. In particular, FIG. 4A shows a unified latent space 422. In one or more embodiments, the multi-modal vector 420 is represented within the unified latent space 422 (e.g., on a graph) and is compared with other vectors. To illustrate, within the unified latent space 422, the multi-modal font recommendation system 102 plots other fonts as points within the unified latent space 422 and determines that points close together (e.g., cosine similarity) within the unified latent space 422 are similar. More details for the latent space similarity calculation, e.g., cosine similarity, are discussed below with respect to FIG. 7.

As also shown, FIG. 4A illustrates fully connected layers 424 as part of the multi-modal font machine-learning model 401. For example, the fully connected layers 424 illustrated in FIG. 4A is a feed forward neural network, and the fully connected layers 424 connects to every activation unit of the next layer. In particular, for FIG. 4A, the fully connected layers 424 compile the data extracted from previous layers to contribute to the final output of font probabilities 428.

In addition to the fully connected layers 424, FIG. 4A shows a softmax layer 426 as part of the multi-modal font machine-learning model 401. For example, softmax is a function that converts a vector of real numbers into a probability distribution of possible outcomes. As shown in FIG. 4A, the softmax layer 426 generates font probabilities 428 from a plurality of fonts relating to a similarity score between the source font and other fonts of the plurality of fonts. As indicated above, in some embodiments, the multi-modal font recommendation system 102 determines a recommended font as the font having a highest font probability of the font probabilities 428. Additionally or alternatively, the multi-modal font recommendation system 102 determines a set of recommended fonts (e.g., top 3, 5, or 10 fonts) as the fonts having the highest font probabilities (e.g., top 3, 5, or 10 probabilities) of the font probabilities 428.

In addition to the features described above, FIG. 4A depicts some additional optional features of the multi-modal font recommendation system 102. In particular, FIG. 4A illustrates the use of natural language processing tags (NLP) 432 and a raster embedding 430. In one or more embodiments, the multi-modal font machine-learning model 401 utilizes NLP tags for further filtering of recommended fonts. NLP tags 432 are discussed in more detail below in the FIG. 8 discussion.

As further shown in FIG. 4A, in one or more embodiments, the multi-modal font recommendation system 102 via the multi-modal font machine-learning model 401 also utilizes a raster embedding 430. In particular, FIG. 4A shows the raster embedding 430 as $f^{rast}$. For instance, as discussed above, prior font recommendation systems merely utilized a rasterized image to make font recommendations. Here, in one or more embodiments, the multi-modal font recommendation system 102 utilizes the visual structure embedding 408, the sequence embedding 410, the glyph metrics embedding 416, and the raster embedding 430 to generate the multi-modal vector 420. Specifically, in some cases, the multi-modal font machine-learning model concatenates $f^{rast}$ with $f^{seq}$, $f^{met}$, and $f^{oc}$ to generate the multi-modal vector 420.

In addition to depicting the generation of a sequence embedding for inference, FIG. 4B also shows the multi-modal font recommendation system 102 training a convolutional neural network 437 and a transformer model 435 as part of a glyph shape-aware machine learning model. In one or more embodiments of training, the glyph shape-aware machine-learning model in FIG. 4B receives input glyphs from a font. In particular, the glyph shape-aware machine-learning model utilizes Bezier curves of other glyphs in the same font style with relative coordinates for each primitive of the curve. Further, from the Bezier sequences, raster versions are generated and used in the encoder. By using both the sequence and raster in the training stages, the representation achieved considers the sequences and the rasterized image.

In one or more embodiments, during training, a single input glyph may not sufficiently capture and represent the style of its core font, thus a few reference glyphs can be used to stabilize the overall font features extracted by the encoder. In particular the following equation represents utilizing a few reference glyphs for training:

$$f^{eq\_rast} = CNN([f^{1seq\_rast}, f^{2seq\_rast}, f^{3seq\_rast}, \ldots f^{Nseq\_rast}])$$

For instance, as shown in the equation above, each seq_rast denotes the raster version of a corresponding input glyph. Furthermore, each feature channel in the convolutional neural network 437 is enabled with parallel processing and all reference images in the channel dimensions are concatenated. A second equation for seq_cmd below denotes the actual command sequence, or the vector outline data used to define a glyph per the specifications of font designers.

$$f^{eq\_cmd} = CNN([f^{1seq\_cmd}, f^{2seq\_cmd}, f^{3seq\_cmd}, \ldots f^{Nseq\_cmd}])$$

The glyph shape-aware machine-learning model generates the sequence embedding ($f^{seq}$) by taking a combination of $f^{seq\_cmd}$ and $f^{eq\_rast}$. Furthermore, for instances of training, outputs from the glyph shape-aware machine-learning model are compared to a ground truth and any losses are back propagated. In particular, the glyph shape-aware machine-learning model utilizes mean absolute error (L1 loss) as its loss function for a rasterized version of an input glyph and cross entropy loss for a vector outline 434.

As described at a high level above, FIG. 4B shows a portion of the glyph shape-aware machine-learning model that analyzes glyph outline shape level representations. For example, as shown in FIG. 4B, the portion of the glyph shape-aware machine-learning model that analyzes glyph outline shape level representations receives the vector outline 434 and a rasterized image 436 of the reference glyph at input nodes via an outline sequence encoder 438. The outline sequence encoder 438, the vector outline 434, and the rasterized image 436 of the reference glyph were discussed above previously. In particular, input nodes correspond to an input variable and the input nodes are a visible layers of the glyph shape-aware machine-learning model.

In one or more embodiments, for the convolutional neural network 437, the input variables of the input nodes via the outline sequence encoder 438 pass through different layers of the glyph shape-aware machine learning model to generate a numerical representation of the input variables. Furthermore, hidden nodes 442 are the layers between the input nodes and embedding output nodes 444. The hidden nodes, as shown in FIG. 4B, include multiple convolutional layers. In each of the convolutional layers, the glyph shape-aware machine-learning model applies a kernel e.g., a filter, to the input variables. As further shown by the figures, the glyph shape-aware machine learning model applies max pooling. In max pooling, the glyph shape-aware machine-learning model down samples and pools the maximum/largest value for each patch of a feature map (generated from the input variables) for the next layer. This process of max pooling happens for each of the convolutional layers.

As mentioned, FIG. 4B shows embedding output nodes 444. For example, the embedding output nodes 444 produce output variables that correspond with the input nodes. FIG. 4B also shows a decoder 446. The outline sequence encoder 438 compresses a vector, whereas the decoder 446 expands the vector to the vector's original input form. For instance, as shown in FIG. 4B, the glyph shape-aware machine-learning model outputs from the decoder 7 generated image 448. The subsequent paragraphs briefly describe loss functions applied based on the generated image 448 and the vector outline 434.

As shown in FIG. 4B, the vector outline 434 also illustrates a transformer model 435 of the glyph shape-aware machine-learning model. For example, FIG. 4B illustrates the transformer model 435 encapsulating information from the vector outline 434 and the convolutional neural network 437 discussed above encapsulates information from the rasterized images 436. In particular, a transformer sequence encoder 452 receives the vector outline 434 for processing. Furthermore, a transformer sequence decoder 454 receives encoded features representing the vector outline 434 to generate a sequence embedding 456.

In one or more embodiments the sequence embedding 456 is trained with a cross entropy loss function against a target outline sequence 458. In particular, rasterization from the target outline sequence 458 provides for a target image 450. As also shown, based on the sequence embedding 456, a differentiable rasterizer 461 generates an output 462 that includes a rasterized image of a glyph refined by the target image 450 and the generated image 448. For example, in the training and inference stages, the output 462 from the differentiable rasterizer 461 are refined by the generated image 448 and the target image 450 using the shown L1 loss function. Furthermore, the multi-modal font recommendation system 102 generates $f^{seq\_cmd}$ from the sequence embedding 456 and the target outline sequence 458 and $f^{seq\_rast}$ from the refined output of the differentiable rasterizer 461. In particular, the multi-modal font recommendation system 102 generates $f^{seq}$ from the combination of $f^{seq\_cmd}$ and $f^{seq\_rast}$. Based on the discussion above, the glyph shape-aware machine learning model is trained to consider both the vector outline 434 and the rasterized images 436 of the input reference glyphs. In some embodiments, the multi-modal font recommendation system 102 implements and/or trains the convolutional neural network 437 and the transformer model 435 as described by Yizhi Wang and Zhouhui Lian, "DeepVecFont: Synthesizing High-quality Vector Fonts via Dual-modality Learning," ACM Trans Graph., Vol. 2, No. 1 (October 2021), available at https://arxiv.org/pdf/2110.06688.pdf, which is hereby incorporated by reference in its entirety.

As shown in FIG. 4C, in some embodiments, a multi-modal font machine-learning model includes a glyph visual structure machine-learning model 468. For example, in certain implementations, the glyph visual structure machine-learning model 468 includes SIFT model architecture. In particular, the SIFT algorithm utilized by the multi-modal font recommendation system 102 assists in detecting, describing, and matching local features in images. In many instances, input images can be rotated, scaled in or out, noisy, blurred or poorly illuminated. However, a local point representation 470 of the reference glyph are invariant to the mentioned issues. For example, for designing fonts, designers do not normalize to a single scale. Thus when two different fonts are rendered at the same font size, the two different fonts appear quite different from one another. Accordingly neural networks based only on a rasterized image of a glyph fail to accurately represent the glyph of a source font (compared to SIFT) because neural networks based only on the rasterized image would determine different sizes of strokes and curves. However, the glyph visual structure machine-learning model 468 makes local point detection robust and captures subtle differences.

FIG. 4C shows the glyph visual structure machine-learning model 468 receiving a rasterized image 464 of a reference glyph at input nodes 466 of a local point representation 470 of the reference glyph. Furthermore, FIG. 4C also shows convolutional layer 1 and convolutional layer 2 of hidden nodes. The same principles discussed above regarding hidden nodes, max pooling, and convolutional layers applies here. In some embodiments, the following equation illustrates local point representation 470 for the reference glyph:

$$f^{loc} = CNN([f^{1loc}, f^{2loc}, f^{3loc}, \ldots, f^{Nloc}])$$

As shown in the equation above, the glyph visual structure machine-learning model 468 implements one or more local point representations of the reference glyph to generate, from embedding output nodes 472, the visual structure embedding 408. In some embodiments, the multi-modal font recommendation system 102 implements and/or trains glyph visual structure machine-learning model 468 as described by Liang Zheng, Yi Yang, and Qi Tian, "SIFT Meets CNN: A Decade Survey of Instance Retrieval," Journal of LateX Class Files, Vol. 14, No. 8 (August 2015), available at https://arxiv.org/pdf/1608.01807.pdf, which is hereby incorporated by reference in its entirety.

As mentioned above, in some embodiments, the multi-modal font recommendation system 102 utilizes glyph metrics to identify recommended fonts. For example, while width and height are general metrics for a font, other glyph metrics, such as ascender, descender, cap height, and stem width, are data points for a font that add subtle nuance and detail to identifying recommended fonts. In particular, the multi-modal font recommendation system 102 captures glyph metrics in terms of horizontal, vertical, and diagonal dimensions.

Figure 5A:
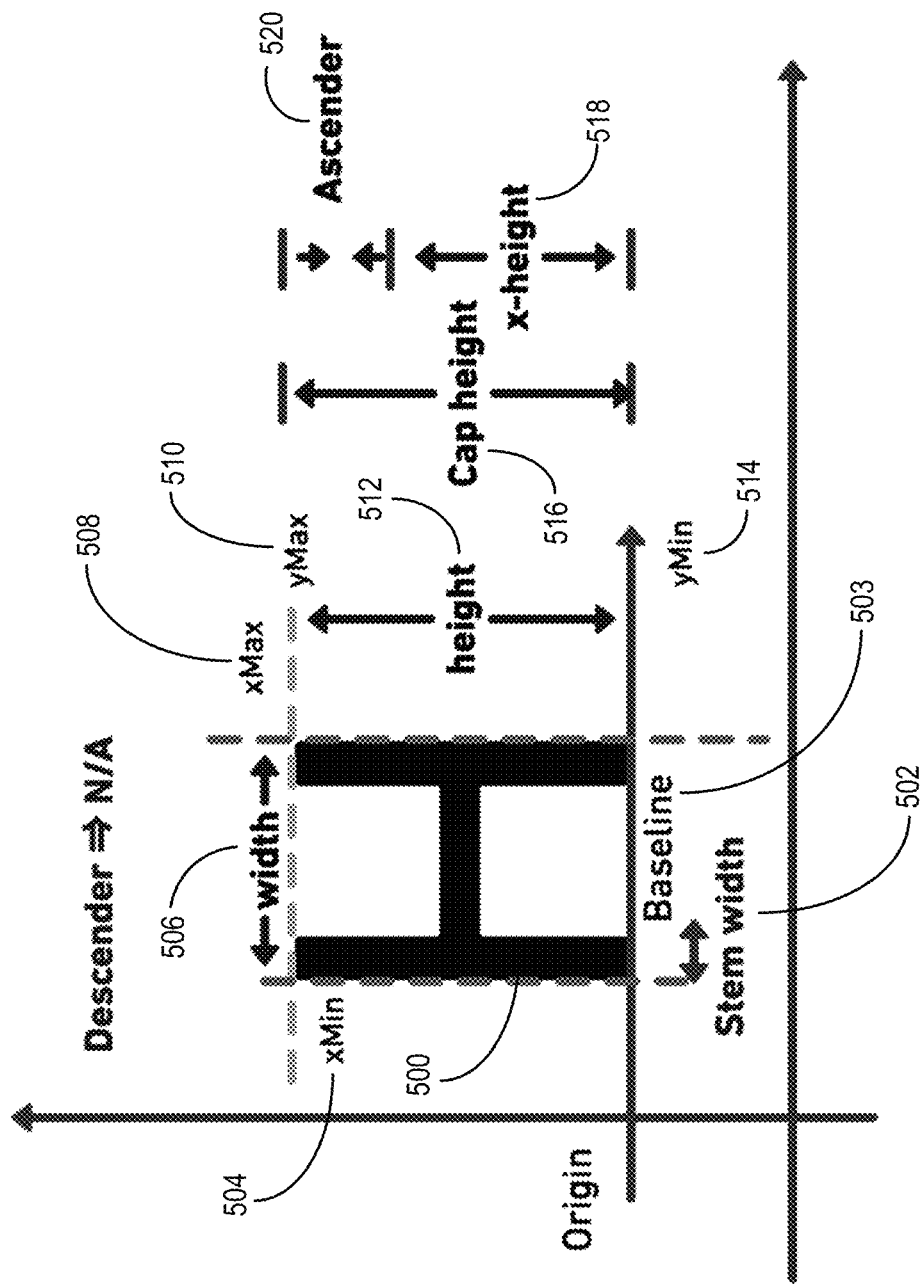
FIGS. 5A-5C illustrates different types of glyph metrics of the multi-modal font recommendation system and normalizing glyph metrics in accordance with one or more embodiments.

As illustrated in FIG. 5A, the multi-modal font recommendation system 102 determines width as a glyph metric. For example, a glyph width 506 includes an absolute value difference between width coordinates of a glyph. Specifically, FIG. 5A illustrates an upper-case glyph 500 "H" on a cartesian plane and the glyph width 506 includes an absolute difference between an x-axis minimum value 504 and an x-axis maximum value 508. As also illustrated in FIG. 5A, the multi-modal font recommendation system 102 determines height as a glyph metric. For example, a glyph height 512 includes an absolute value difference between height coordinates of a glyph. Specifically, FIG. 5A illustrates the glyph height 512 as including an absolute difference between a y-axis minimum value 514 and a y-axis maximum value 510.

Further, FIG. 5A illustrates the multi-modal font recommendation system 102 determining an ascender as a glyph metric. For example, a glyph ascender 520 includes an absolute value difference between two values. In particular, the glyph ascender 520 includes an absolute difference between the y-axis minimum value 514 and an x-axis height value 518. For instance, in some cases, the glyph ascender 520 is the portion of a glyph that extends above the mean line of a font. Further, for lower-case characters, the glyph ascender 520 is the part of a lower-case character that is taller than the font's x-axis height value 518.

As just mentioned, a glyph ascender utilizes the x-axis height value 518. For example, the multi-modal font recommendation system 102 computes the x-axis height value 518 based on a lower-case glyph. Furthermore, the multi-modal font recommendation system 102 computes the x-axis height value 518 in one or more implementations based on an OS/2 table (e.g., a data table that includes a set of metrics and other data required for OpenType fonts).

In contrast to the x-axis height value 518, the multi-modal font recommendation system 102 computes a cap height 516. For example, the cap height 516 includes a computation from an upper-case glyph. Furthermore, similar to the x-axis height value 518, the multi-modal font recommendation system 102 in one or more implementations also computes the cap height 516 from the OS/2 table. Moreover, the multi-modal font recommendation system 102 determines a units-per-em as a glyph metric. In particular, the units-per-em is computed from an algorithm or by utilizing a head table data of the glyph.

Further, the multi-modal font recommendation system 102 determines stem width 502 as a glyph metric. As shown in FIG. 5A, for example, the stem width 502 constitutes a width of the stem of the upper-case glyph 500 "H". In particular, the multi-modal font recommendation system 102 utilizes a pre-computed stem width from table data of the glyph. Although not illustrated in FIG. 5A, in one or more embodiments, the multi-modal font recommendation system 102 utilizes a baseline 503, an average glyph contrast, and/or a stem angle as glyph metrics. In particular, the average glyph contrast includes computing one or more metrics across multiple glyphs of a font and determining an average contrast between different metrics, such as an average difference between the glyph width of a font. Moreover, in one or more embodiments, the multi-modal font recommendation system 102 determines the stem angle metric as a glyph metric. In particular, the multi-modal font recommendation system 102 measures the stem angle in degrees within a plane.

Figure 5B:
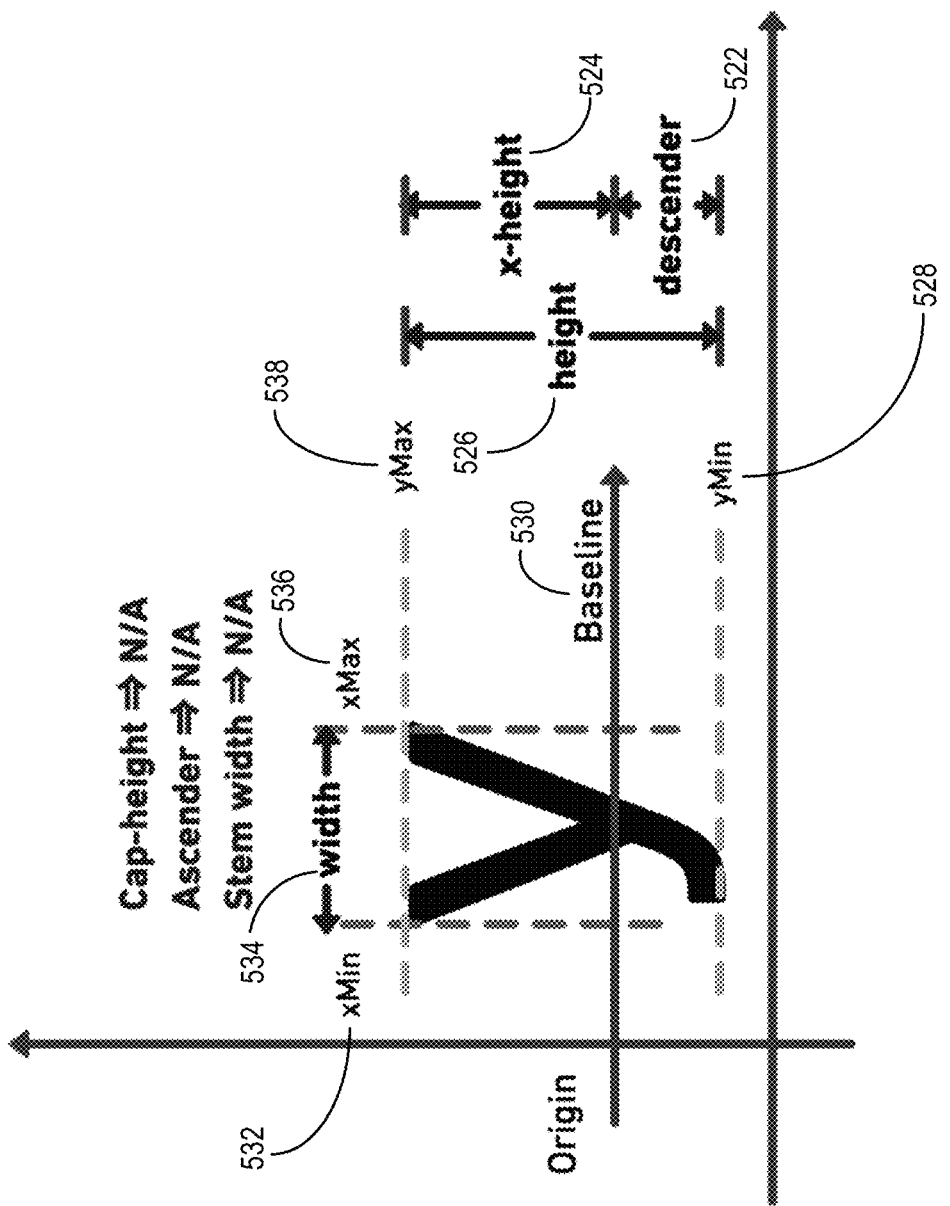

Similar to FIG. 5A, FIG. 5B illustrates various glyph metrics for lower-case glyph "y". For example, FIG. 5B shows various metrics for the lower-case glyph, such as an x-axis minimum value 532, an x-axis maximum value 536, a glyph width 534, a y-axis maximum value 538, a y-axis minimum value 528, a glyph height 526, and an x-axis height 524. These glyph metrics apply in the same manner as discussed above in relation to FIG. 5A. Furthermore, FIG. 5B illustrates a descender 522 and a baseline 530. In particular, the descender 522 includes an absolute difference value between the y-axis minimum value 528 and the baseline 530.

Figure 5C:
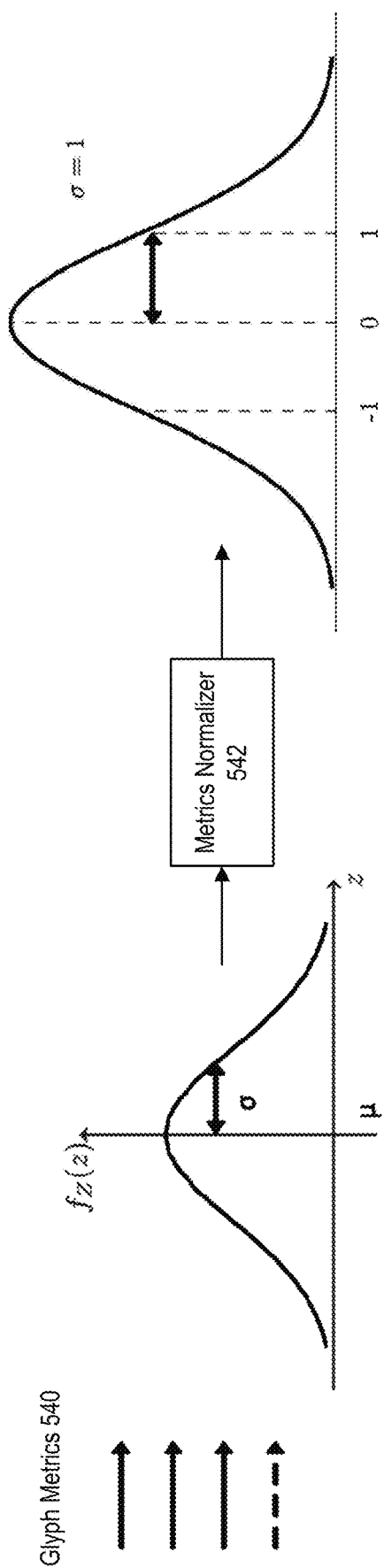

As mentioned above, in some cases, the multi-modal font recommendation system 102 utilizes a metrics normalizer 542. For example, FIG. 5C shows a glyph metrics analyzer receiving glyph metrics 540. In particular, the glyph metrics analyzer represents p as the mean and a the standard deviation of the received glyph metrics 540. For instance, in some embodiments, the glyph metrics analyzer utilizes a z-score normalization to determine where the glyph metrics 540 lie on a normal distribution curve. Further, to illustrate, a small z-score implies the font attributes are the mean/average while a larger z-score scores indicates that the attribute for the glyph metric is above average or in some cases an outlier.

In one or more embodiments, the multi-modal font recommendation system 102 normalizes glyph metrics for further processing. In particular, the multi-modal font recommendation system 102 normalizes glyph metrics for processing within a multi-layer perceptron. For instance, in some cases, the multi-modal font recommendation system 102 represents the multi-layer perceptron with the following equation:

$$f = \text{MLP}([f^{loc}, f^{seq}, f^{met}])$$

To illustrate, in some cases, the multi-layer perceptron is a feed-forward neural network and a single perceptron receives features as input and a categorical feature with values are converted into input features representing the presence or absence of values within the above multi-layer perceptron equation. Furthermore, in one or more embodiments, the multi-modal font recommendation system 102 utilizes a computer code implementation for a multi-modality blender. For example, the multi-modal font recommendation system 102 can utilize the multi-modality blender algorithm in the table below to implement a multi-layer perceptron:

```
import numpy as np
classMultiModalityBlender (nn. Module ):
def___init___(self , loc_feat_dimension , met_fc , hidden_sz ,
ref_nshot , bottleneck_bits , operating_mode ='train '):
super ( ). ___init___ ( )
self . operating_mode = operating_mode
self . bottleneck_bits = bottleneck_bits
self . ref_nshot = ref_nshot
self . hidden_size = hidden_sz
self . outline_fc = nn. Linear ( ref_nshot * hidden_size * 2,
hidden_size , bias = True )
self . met_fc = met_fcn
self .fc = nn. Linear ( loc_feat_dimension + hidden_size , 2 *
bottleneck_bits , bias = True )
# self .fc = nn. Linear ( loc_feat_dimension , 2 * bottleneck_bits ,
bias = True )
def forward (self , loc_feat , outline_feat , met_feat ):
# concatenation + fc for modality blending , and calculate the mean ,
std , kl loss etc
# loc_feat : [ opts . batch_size , opts .ngf * (2 ** 6)]
# met_feat : [ opts . batch_size , ....]
# outline_feat : [ opts . batch_size * opts . ref_nshot , opts .
hidden_size * 2] ( hidden and cell )
outline_feat = outline_feat . view ( loc_feat . size (0) , self .
ref_nshot * self . hidden_size * 2)
feat_cat = torch .cat (( loc_feat , self . outline_fc
( outline_feat )) ,-1)
feat_cat = torch .cat (( feat_cat , self . met_fc ( met_feat )) ,-1)
dist_param = self .fc( feat_cat )
output = { }
mu = dist_param [... , : self . bottleneck_bits ]
log_sigma = dist_param [... , self . bottleneck_bits :]
# ..
# Perform training or inference further
return output
```

In particular, the above table illustrates a multi-modality blender computer code implementation of: $f = \text{MLP}([f^{loc}, f^{seq}, f^{met}])$ For instance, the above table shows a multi-layer perceptron concatenating a visual structure embedding, an outline sequence embedding, and a glyph metrics embedding in python syntax.

As mentioned above, in certain embodiments, the multi-modal font recommendation system 102 generates a final multi-modal vector 608 for identifying recommended fonts.

Figure 6:
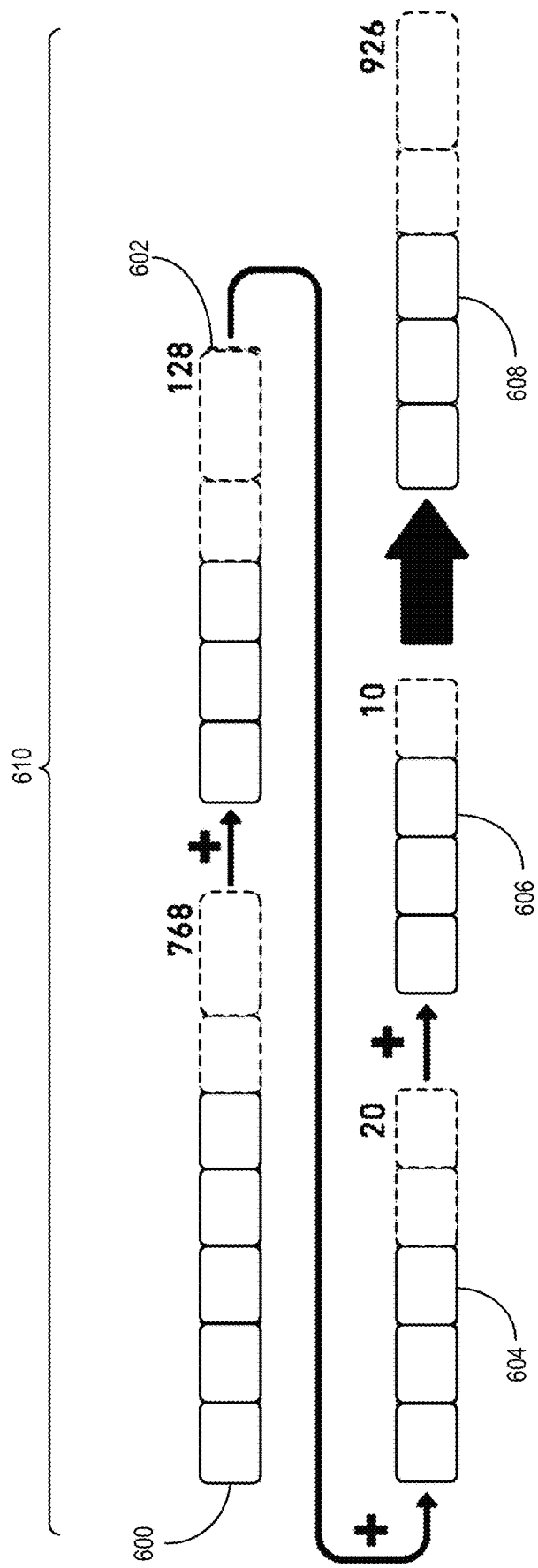
FIG. 6 illustrates an example diagram of the multi-modal font recommendation system concatenating embeddings to generate a multi-modal vector in accordance with one or more embodiments.

For example, FIG. 6 illustrates a concatenation 610 of each of the embeddings to form the final multi-modal vector 608. In particular, the vector in FIG. 6 is represented by the following equation:

$$\text{feat}_{vec}^{model} = ([\text{feat}_{vec}^{seq} | \text{feat}_{vec}^{rast} | \text{feat}_{vec}^{loc} | \text{feat}_{vec}^{glyph}])$$

As shown in FIG. 6, in some embodiments, a sequence embedding 600 has a dimensional space of 768, a rasterized image embedding 602 has a dimensional space of 128, a visual structure embedding 604 has a dimensional space of 20, and a glyph metrics embedding 606 has a dimensional space of 10. As indicated above, in some cases, the multi-modal font recommendation system 102 concatenates the sequence embedding 600, the rasterized image embedding 602, the visual structure embedding 604, and the glyph metrics embedding 606 to generate a final multi-modal vector 608. As shown, the concatenation 610 of all these embeddings results in the final multi-modal vector 608, e.g., the final feature vector, with a dimensional space of 926.

Figure 7:
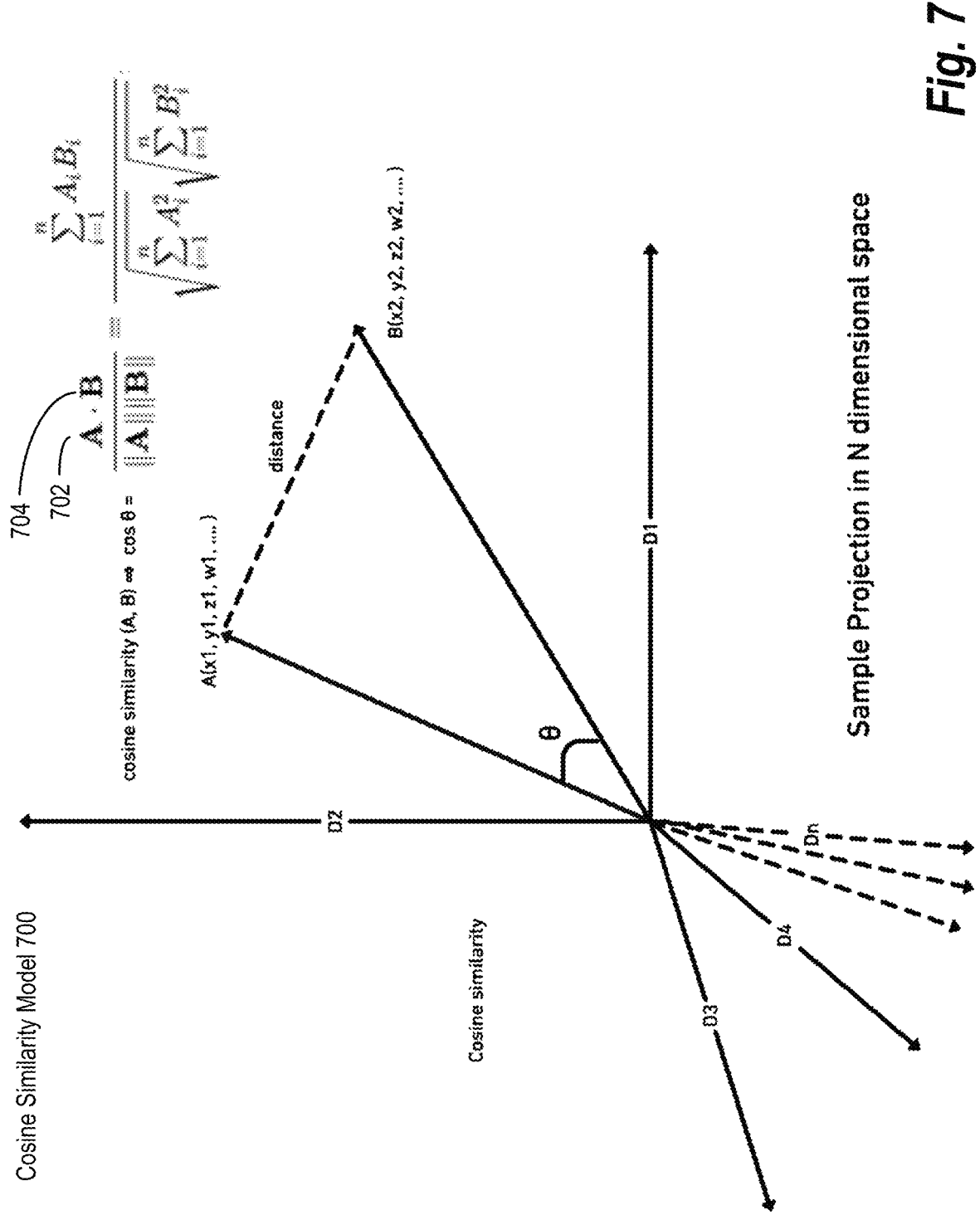
FIG. 7 illustrates an example diagram of a cosine similarity model utilized to identify a recommended font in accordance with one or more embodiments.

As discussed above, in some embodiments, the multi-modal font recommendation system 102 utilizes a latent space to identify recommended fonts. As shown, FIG. 7 illustrates a cosine similarity model 700 that compares a multi-modal vector representing a source font with candidate multi-modal vectors representing candidate fonts. For example, the multi-modal vector in the latent space allows for multi-modal font recommendation system 102 to make a latent space similarity calculation. In particular, the multi-modal font recommendation system 102 compares a multi-modal vector 702 for a source font with candidate multi-modal vectors representing candidate fonts-including a multi-modal vector 704 for a recommended font. Based on such a cosine-similarity comparison in latent space, the multi-modal font recommendation system 102 determines that a recommended font is most similar to a recommended font.

Specifically, in FIG. 7, the multi-modal font recommendation system 102 utilizes the cosine similarity model to determine the closeness between the multi-modal vector 704 for a recommended font and the multi-modal vector 702 for a source font. For instance, FIG. 7 shows the cosine similarity as follows:

$$\cos(A, B) = \frac{(A \times B)}{\|A\| \|B\|} = \frac{\sum_{i=1}^{n} A_i B_i}{\sqrt{\sum_{i}^{n} A_i^2} \sqrt{\sum_{i}^{n} B_i^2}}$$

As shown in the equation above and in FIG. 7, the multi-modal vector 702 for a source font is represented by "A" and the multi-modal vector 704 for a recommended font is represented by "B". In particular, by utilizing the relationship represented in the above equation, an angle between point "A" and point "B" is determined, where the angle represents the cosine similarity calculation within the latent space. The above equation essentially measures the similarity between two multi-modal vectors by utilizing the cosine of the angle between two multi-modal vectors to determine whether two such vectors approximately point in the same direction. Accordingly, via the cosine similarity model 700, the multi-modal font recommendation system 102 calculates the cosine similarity and identifies recommended fonts with the closest or highest cosine similarity score to a multi-modal vector for a source font.

Figure 8:
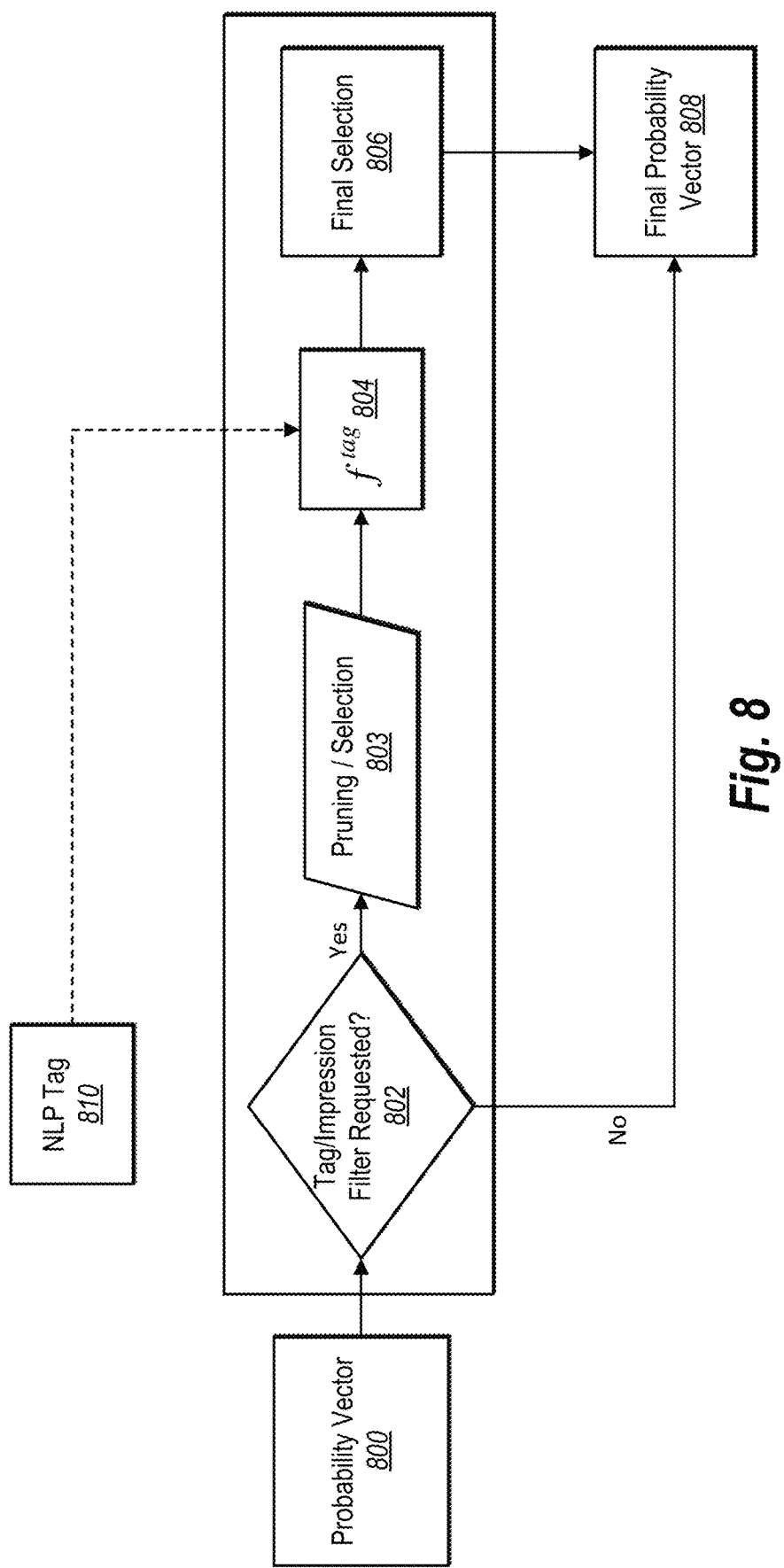
FIG. 8 illustrates an example diagram of the multi-modal font recommendation system identifying natural language processing tags for further identifying a recommended font in accordance with one or more embodiments.

As also mentioned above, in some embodiments, the multi-modal font recommendation system 102 processes the multi-modal vector within inference layers to further filter recommended fonts. For example, FIG. 8 shows the use of additional tags for determining a final probability vector 808. In particular, the multi-modal font recommendation system 102 utilizes a dynamic inference, e.g., on demand inference for strict matches against a tag, to further filter recommended fonts. For instance, the multi-modal font recommendation system 102 (i) performs dynamic inference in response to a client device selecting an option to further filter with tags or (ii) automatically filters with tags in response to a client device requesting font recommendations.

As shown in FIG. 8, the multi-modal font recommendation system 102 receives a probability vector 800 (e.g., from a softmax layer). For example, FIG. 8 shows a decision tree 802 for when a tag/impression filter is requested. In particular, when a tag/impression filter is requested, a dynamic inference model of the multi-modal font recommendation system 102 performs an act 803 of pruning candidate fonts. For instance, the dynamic inference model prunes candidate fonts by selecting a subset of candidate fonts, while in other embodiments, the dynamic inference model removes a subset of candidate fonts based on a tag. In one or more embodiments, candidate fonts includes a set of fonts that the multi-modal font recommendation system 102 analyzes for potential similarity (or sameness) with a source font.

As further shown by FIG. 8, the dynamic inference model of the multi-modal font recommendation system 102 generates a tag embedding 804. In particular, FIG. 8 shows that in one or more embodiments, a natural language processing (NLP) tag is applied to the tag embedding 804. For instance, the multi-modal font recommendation system 102 utilizes the NLP tags for classifying glyphs of candidate fonts. Furthermore, FIG. 8 illustrates a final selection 806 of the multi-modal font recommendation system 102 to identify the recommended font from the subset of candidate fonts based on the tag embedding 804 representing the NLP tag 810.

Figure 9A:
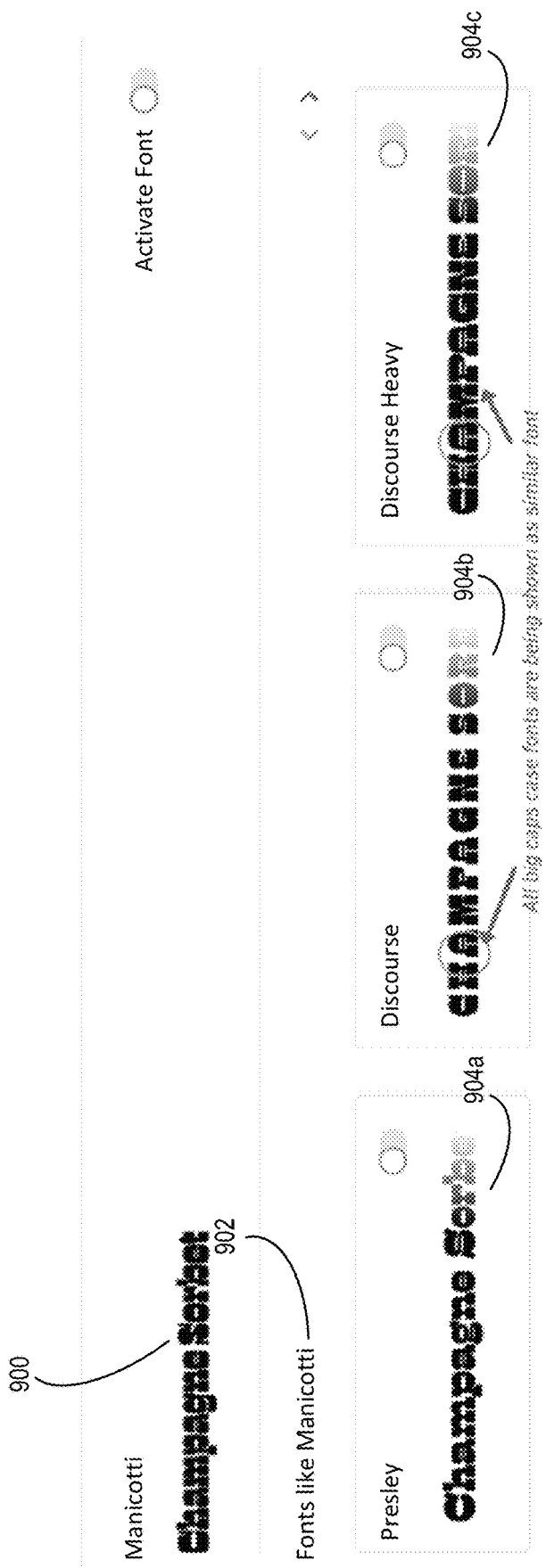
FIGS. 9A-9B illustrates additional example graphical user interfaces of the multi-modal font recommendation system identifying recommended fonts corresponding to a source font in accordance with one or more embodiments.
Figure 9B:
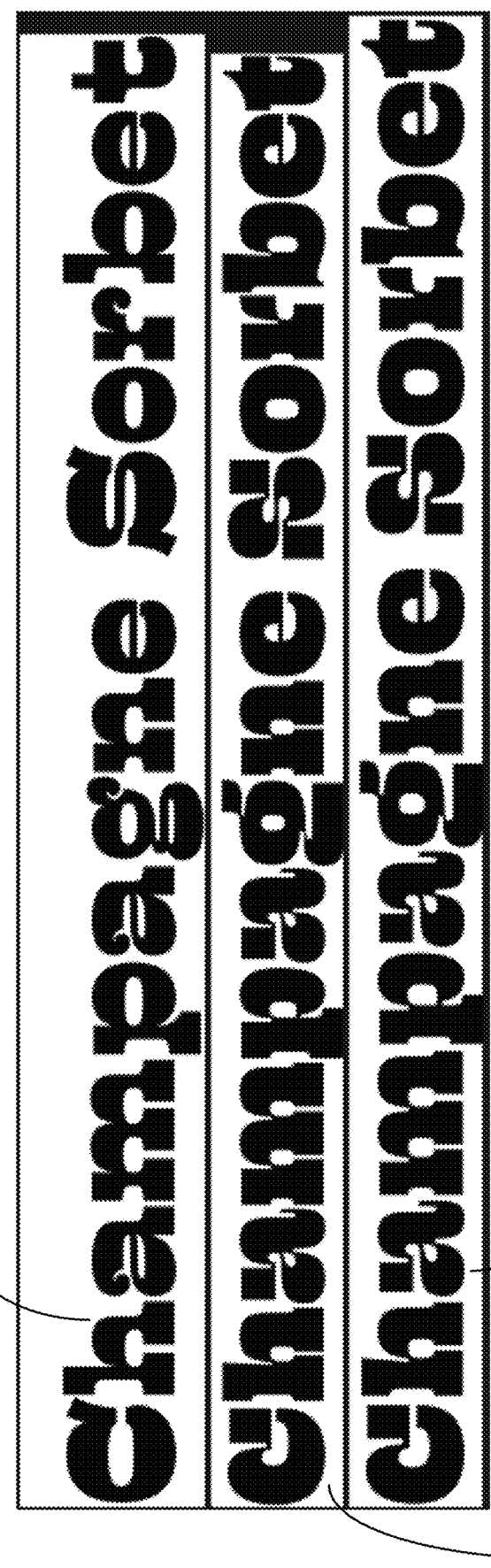

As discussed above, FIGS. 2A and 2B showed example recommended fonts determined by either prior font recommendation systems or the multi-modal font recommendation system 102. In accordance with one or more embodiments, FIGS. 9A-9B are additional example graphical user interface of a prior system and the multi-modal font recommendation system 102. FIG. 9A shows input source font 900 as "Manicotti Regular" and recommendation message 902 with recommended fonts 904a, 904b, and 904c. In particular, FIG. 9A is an illustration of prior systems recommending fonts that are dissimilar to the input source font 900. For instance, the recommended fonts 904b-904c show uppercase fonts as a similar font when the input source font 900 does not show upper-case fonts for all the glyphs of the font.

In contrast to the recommended fonts 904a-904c, as illustrated by FIG. 9B, the multi-modal font recommendation system 102 provides recommended fonts 907-910, which provides similar fonts to the input source font 900. For example, as shown in FIG. 9B, each of the recommended fonts 907-910 show similarities in appearance to the input source font 900. In particular, as compared to the recommended fonts 904b-904c the recommended fonts 907-910 do not indicate fading or all caps and more tightly conform with the rendered appearance of the input source font 900.

Figure 10A:
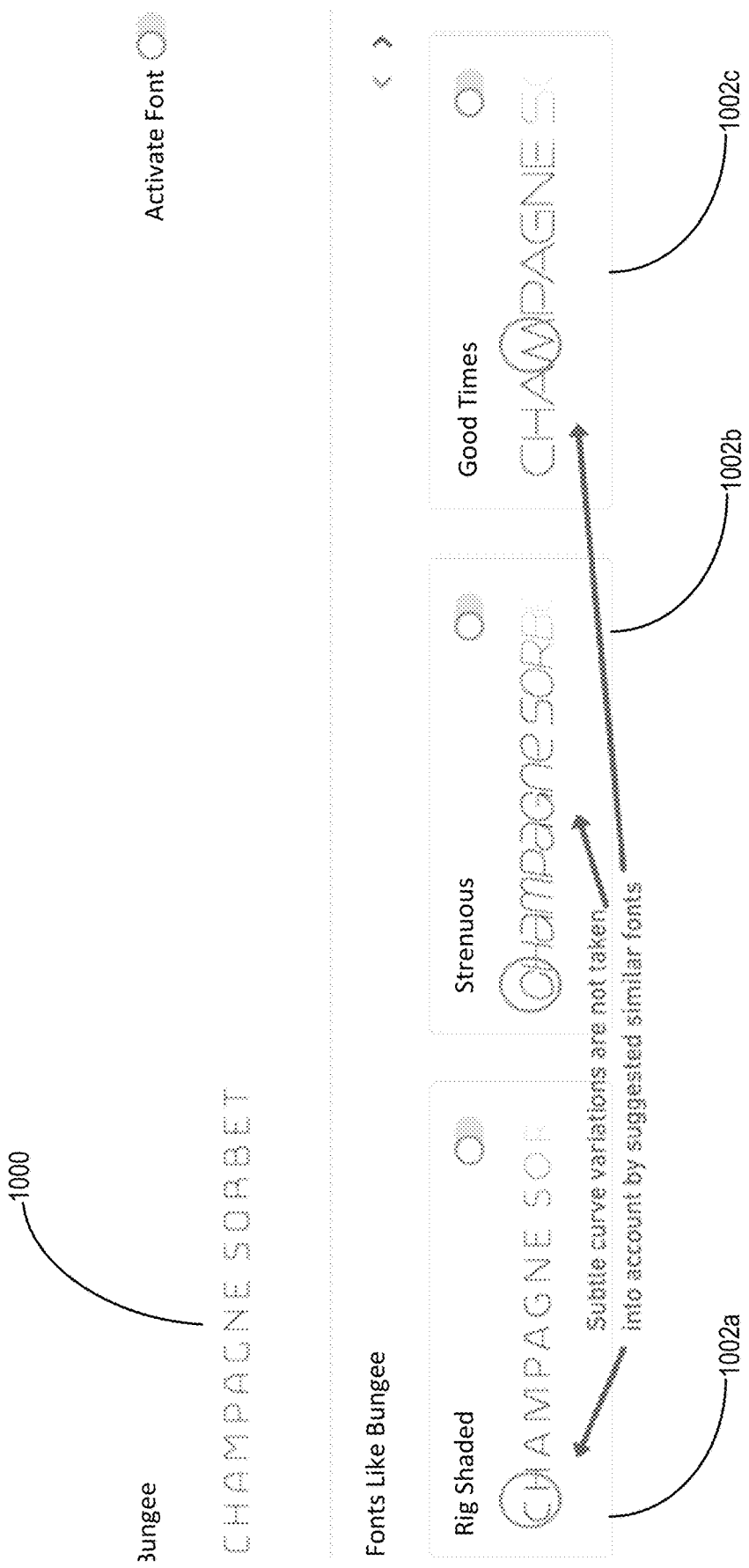
FIGS. 10A-10B illustrates additional example graphical user interfaces of the multi-modal font recommendation system identifying recommended fonts corresponding to a source font in accordance with one or more embodiments.
Figure 10B:
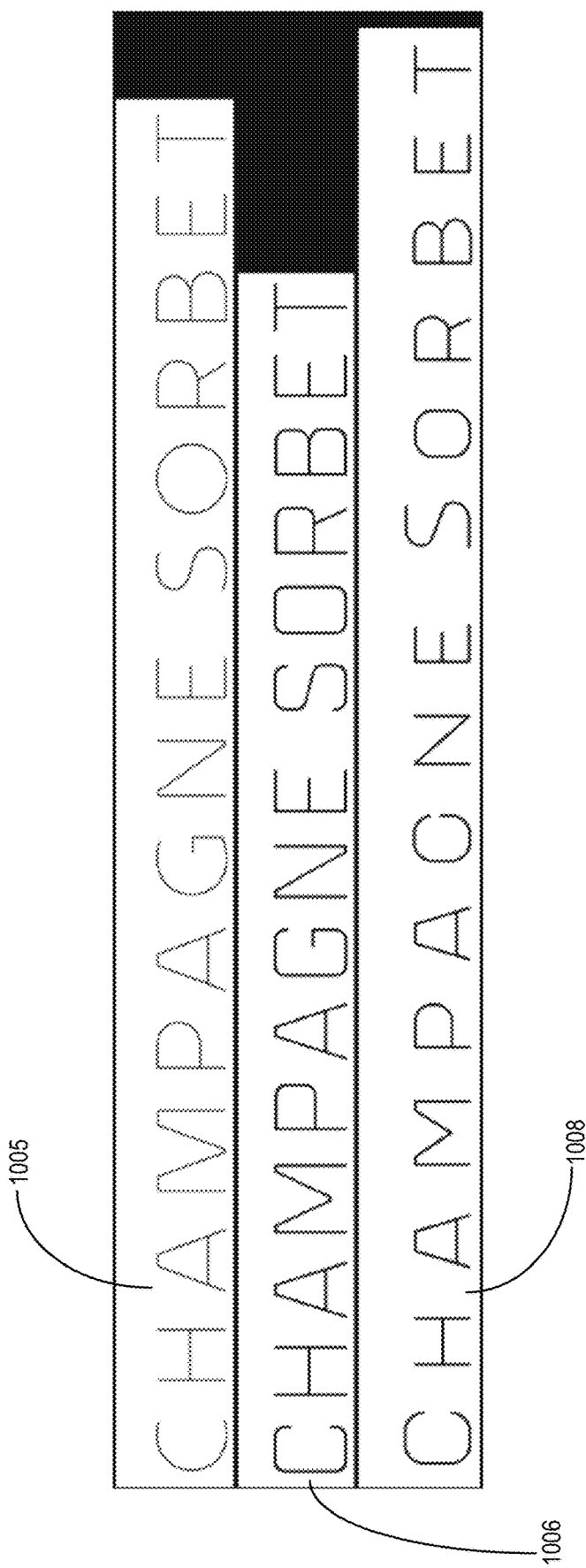

Similarly, FIGS. 10A-10B also show an example graphical user interface of a prior system and the multi-modal font recommendation system 102. FIG. 10A shows an input source font 1000 of font "Bungee Hairline" and prior font recommendation system recommendations of recommended fonts 1002a-1002c. For instance, the recommended fonts 1002a, 1002b, and 1002c show curve variations in individual characters that are not present in the input source font 1000. The prior font recommendation system recommendations for recommended fonts 1002a-1002c illustrate that prior font recommendation systems fail to consider subtle features of the fonts for making recommendations.

However, as illustrated by FIG. 10B, the multi-modal font recommendation system 102 provides recommended fonts 1005-1008 which provide much more similar fonts than the recommended fonts 1002a-1002c. For example, as shown in FIG. 10B, the recommended fonts 1005-1008 illustrate similar a appearance to the input source font 1000. In particular, the recommended fonts 1005-1008 illustrate a similar cap-case, and curvature to each of the glyphs. As compared to the prior font recommendations for recommended fonts 1002a-1002c, the recommended fonts 1005-1008 do not indicate curve variations not present in the input source font 1000.

Figure 11:
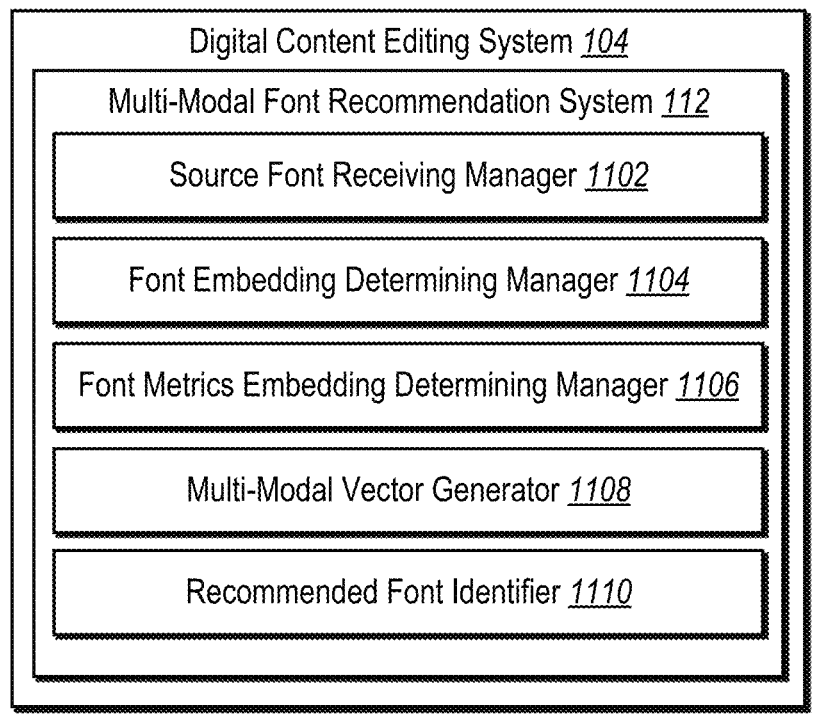
FIG. 11 illustrates an example schematic diagram of the multi-modal font recommendation system in accordance with one or more embodiments

Turning to FIG. 11, additional detail will now be provided regarding various components and capabilities of the multi-modal font recommendation system 102. In particular, FIG. 11 illustrates an example schematic diagram of the digital-content-editing system 104 implementing the multi-modal font recommendation system 102 in accordance with one or more embodiments of the present disclosure. Each of the components 1102-1110 of the multi-modal font recommendation system 102 can include software, hardware, or both. For example, the components 1102-1110 can include one or more instructions stored on a computer-readable storage medium and executable by processors of one or more computing devices, such as a client device or server device. When executed by the one or more processors, the computer-executable instructions of the multi-modal font recommendation system 102 can cause the computing device(s) to perform the methods described herein. Alternatively, the components 1102-1110 can include hardware, such as a special-purpose processing device to perform a certain function or group of functions. Alternatively, the components 1102-1110 of the multi-modal font recommendation system 102 can include a combination of computer-executable instructions and hardware. As illustrated in FIG. 11, the multi-modal font recommendation system 102 includes a source font receiving manager 1102, a font embedding determining manager 1104, a glyph metrics embedding determining manager 1106, a multi-modal vector generator 1108, and a recommended font identifier 1110.

The source font receiving manager 1102 acts as a sub-component of the multi-modal font recommendation system 102. The source font receiving manager 1102 receives, manages, and processes source fonts. For example, the source font receiving manager 1102 receives rasterized images of fonts, vector outlines, font files, metadata font files of the received font, or any other file including data of a source font. In receiving the source font, the source font receiving manager 1102 communicates with the multi-modal font recommendation system 102 for identifying fonts similar to the received source font.

The font embedding determining manager 1104 receives information from other sub-components of the multi-modal font recommendation system 102 and the multi-modal font recommendation system 102 itself to determine a font embedding. For example, the font embedding determining manager receives information of a reference glyph of the source font for making a determination. In particular, the font embedding determining manager 1104 also provides the determined font embedding to the multi-modal font recommendation system 102 for further processing and identifying recommended fonts.

The glyph metrics embedding determining manager 1106 receives information from other sub-components of the multi-modal font recommendation system 102 and the multi-modal font recommendation system 102 itself to determine a glyph metrics embedding. For example, the glyph metrics embedding determining manager receives measurements of a reference glyph of the source font for making a determination. In particular, the font embedding determining manager 1104 also provides the determined glyph metrics embedding to the multi-modal font recommendation system 102 for further processing and identifying recommended fonts.

The multi-modal vector generator 1108 receives information from other sub-components of the multi-modal font recommendation system 102 and the multi-modal font recommendation system 102 itself to generate the multi-modal vector. For example, the multi-modal vector generator 1108 receives the glyph metrics embedding from the glyph metrics embedding determining manager 1106 and the font embedding from the font embedding determining manager 1104. In doing so, the multi-modal vector generator 1108 generates the multi-modal vector based on the glyph metrics embedding and the font embedding.

The recommended font identifier 1110 receives information from other sub-components of the multi-modal font recommendation system 102 and the multi-modal font recommendation system 102 itself to identify recommended fonts. For example, the recommended font identifier 1110 receives the multi-modal vector from the multi-modal vector generator 1108 to identify one or more recommended fonts. Specifically, the recommended font identifier 1110 utilizes a plurality of fonts to identify a subset of candidate fonts and then identifies a font from the subset of candidate fonts to determine a recommended font.

Furthermore, the components 1102-1110 of the multi-modal font recommendation system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1102-1110 of the multi-modal font recommendation system 102 may be implemented as a stand-alone application, such as a desktop or mobile application. Furthermore, the components 1102-1110 of the multi-modal font recommendation system 102 may be implemented as one or more web-based applications hosted on a remote server. Alternatively, or additionally, the components 1102-1110 of multi-modal font recommendation system 102 may be implemented in a suite of mobile device applications or "apps." For example, in one or more embodiments, the multi-modal font recommendation system 102 can comprise or operate in connection with digital software applications such as ADOBE® CREATIVE CLOUD EXPRESS, ADOBE® PHOTOSHOP®, ADOBE® INDESIGN®, ADOBE PRINT®, or ADOBE® ILLUSTRATOR®. "ADOBE," "PHOTOSHOP," "INDESIGN," "ADOBE PRINT," and "ILLUSTRATOR" are either registered trademarks or trademarks of Adobe Inc. in the United States and/or other countries.

FIGS. 1-11, the corresponding text, and the examples provide a number of different methods, systems, devices, and non-transitory computer-readable media of the multi-modal font recommendation system 102. In addition to the foregoing, one or more embodiments can also be described in terms of flowcharts comprising acts for accomplishing the particular result, as shown in FIG. 12. FIG. 12 may be performed with more or fewer acts. Further, the acts may be performed in different orders. Additionally, the acts described herein may be repeated or performed in parallel with one another or in parallel with different instances of the same or similar acts.

FIG. 12 illustrates a flowchart of a series of acts 1200 for generating a multi-modal vector and identifying a recommended font based on the multi-modal vector in accordance with one or more embodiments. FIG. 12 illustrates acts according to one embodiment, alternative embodiments may omit, add to, reorder, and/or modify any of the acts shown in FIG. 12. In some implementations, the acts of FIG. 12 are performed as part of a method. For example, in some embodiments, the acts of FIG. 12 are performed as part of a computer-implemented method. Alternatively, a non-transitory computer-readable medium can store instructions thereon that, when executed by at least one processor, cause a computing device to perform the acts of FIG. 12. In some embodiments, a system performs the acts of FIG. 12. The system further includes at least one server device configured to cause the system to perform the acts of FIG. 12.

The series of acts 1200 includes an act 1202 for receiving an indication of a source font. For example, the act 1202 includes receiving, from a computing device, an indication of a source font.

Additionally, the series of acts 1200 includes an act 1204 of determining font embeddings and a glyph metrics embedding of the reference glyph. In one or more embodiments, the act 1204 includes determining font embeddings for a reference glyph of the source font and a glyph metrics embedding for measurements of the reference glyph. Furthermore, the act 1204 includes wherein determining the font embeddings for the source font further comprises determining a sequence embedding representing an outline of the reference glyph and a visual structure embedding representing local points of the reference glyph.

In one or more embodiments, the act 1204 includes wherein determining the sequence embedding representing the outline of the reference glyph further comprises generating, utilizing an outline sequence encoder, a vector representing sequence aspect features of the reference glyph based on a rasterized image of the reference glyph and a vector outline of the reference glyph. Additionally, the act 1204 also includes wherein determining the visual structure embedding representing the local points of the reference glyph further comprises generating, utilizing a local point encoder, a vector representing local structure points and comprising invariant features of the reference glyph based on a rasterized image of the reference glyph.

Further, in one or more embodiments, the act 1204 includes wherein determining the glyph metrics embedding for measurements of the reference glyph further comprises: determining, utilizing a glyph metrics analyzer, glyph metrics of the reference glyph and normalizing, utilizing a metrics normalizer, the glyph metrics based on a distribution of glyph metrics. The act 1204 also includes wherein determining the glyph metrics further comprises determining at least one of a glyph width, a glyph height, a glyph ascender metric, a glyph descender metric, a lower-case height, an upper-case height, a units-per-em metric, a stem width, an average glyph contrast, or a stem angle. Moreover, the act 1204 includes determining the font embeddings comprises a sequence embedding representing an outline of the reference glyph and a visual structure embedding representing local points of the reference glyph. Additionally, the act 1204 includes determining a sequence embedding representing an outline of at least the reference glyph and a visual structure embedding representing local points of at least the reference glyph.

The series of acts 1200 also includes an act 1206 of generating a multi-modal vector. The act 1206 includes generating, utilizing a multi-modal font machine-learning model, a multi-modal vector representing the source font based on the font embeddings and the glyph metrics embedding. To illustrate, the act 1206 includes wherein generating the multi-modal vector representing the source font further comprises concatenating the font embeddings and the glyph metrics embedding. Further, the act 1206 includes generating the multi-modal vector comprises concatenating, utilizing a multi-layer perceptron, the sequence embedding, the visual structure embedding, and the glyph metrics embedding.

Further, the series of acts 1200 includes an act 1208 of identifying a recommended font based on the multi-modal vector. The act 1208 includes identifying a recommended font corresponding to the source font based on the multi-modal vector. Further, the act 1208 includes wherein identifying the recommended font corresponding to the source font based on the multi-modal vector further comprises identifying natural language processing (NLP) tags classifying glyphs of candidate fonts, determining a subset of candidate fonts of the candidate fonts based on the NLP tags, and identifying, from the subset of candidate fonts, the recommended font corresponding to the source font based on the multi-modal vector.

Moreover, the act 1208 includes wherein identifying the recommended font corresponding to the source font based on the multi-modal vector further comprises: determining, utilizing a cosine similarity model, cosine similarities between the multi-modal vector and candidate multi-modal vectors for candidate fonts, and determining, from among the candidate multi-modal vectors, a candidate multi-modal vector for the recommended font corresponds to a highest cosine similarity.

Additionally, the series of acts 1200 includes an act of determining the sequence embedding, the visual structure embedding, and the glyph metrics embedding for multiple reference glyphs of the source font. In one or more embodiments, the multi-modal font recommendation system 102, for the series of acts 1200 extracting, from at least a rasterized image of at least the reference glyph, one or more local points, and generating, utilizing a local point encoder, a scale-invariant feature transform (SIFT) vector representing local structure points of at least the reference glyph.

In other instances, the series of acts 1200 further comprises determining, utilizing a glyph metrics analyzer, glyph metrics of at least the reference glyph, processing dimensions for the glyph metrics of at least the reference glyph, and normalizing, by utilizing a glyph metric normalizer, the processed dimensions for the glyph metrics of at least the reference glyph.

In one or more embodiments, the multi-modal font recommendation system 102, for the series of acts 1200 performs the acts of generating the multi-modal vector representing the source font further comprises concatenating, utilizing a multi-modality blender algorithm, the sequence embedding, the visual structure embedding, and the glyph metrics embedding.

In one or more embodiments, the multi-modal font recommendation system 102, for the series of acts 1200 performs the acts of wherein identifying the recommended font corresponding to the source font based on the multi-modal vector further comprises: identifying natural language processing (NLP) tags classifying glyphs of the candidate fonts, removing a subset of candidate fonts of the candidate fonts based on the NLP tags, and identifying, from a remaining subset of candidate fonts of the candidate fonts, the recommended font corresponding to the source font based on the multi-modal vector.

In one or more embodiments, the multi-modal font recommendation system 102, for the series of acts 1200 performs the acts of identifying the recommended font corresponding to the source font based on the multi-modal vector further comprises: determining a final multi-modal vector representing the source font by: generating a raster embedding representing a rasterized image of at least the reference glyph, and concatenating the sequence embedding, the visual structure embedding, the glyph metrics embedding, and the raster embedding.

In one or more embodiments, the multi-modal font recommendation system 102, for the series of acts 1200 performs the acts of determining the glyph metrics embedding for measurements of at least the reference glyph further comprises: determining, from metadata for multiple reference glyphs, glyph metrics of the multiple reference glyphs, processing the glyph metrics of the multiple reference glyphs for horizontal, vertical, and diagonal dimensions, and normalizing, by utilizing a glyph metric normalizer, the glyph metrics based on a distribution of glyph metrics.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
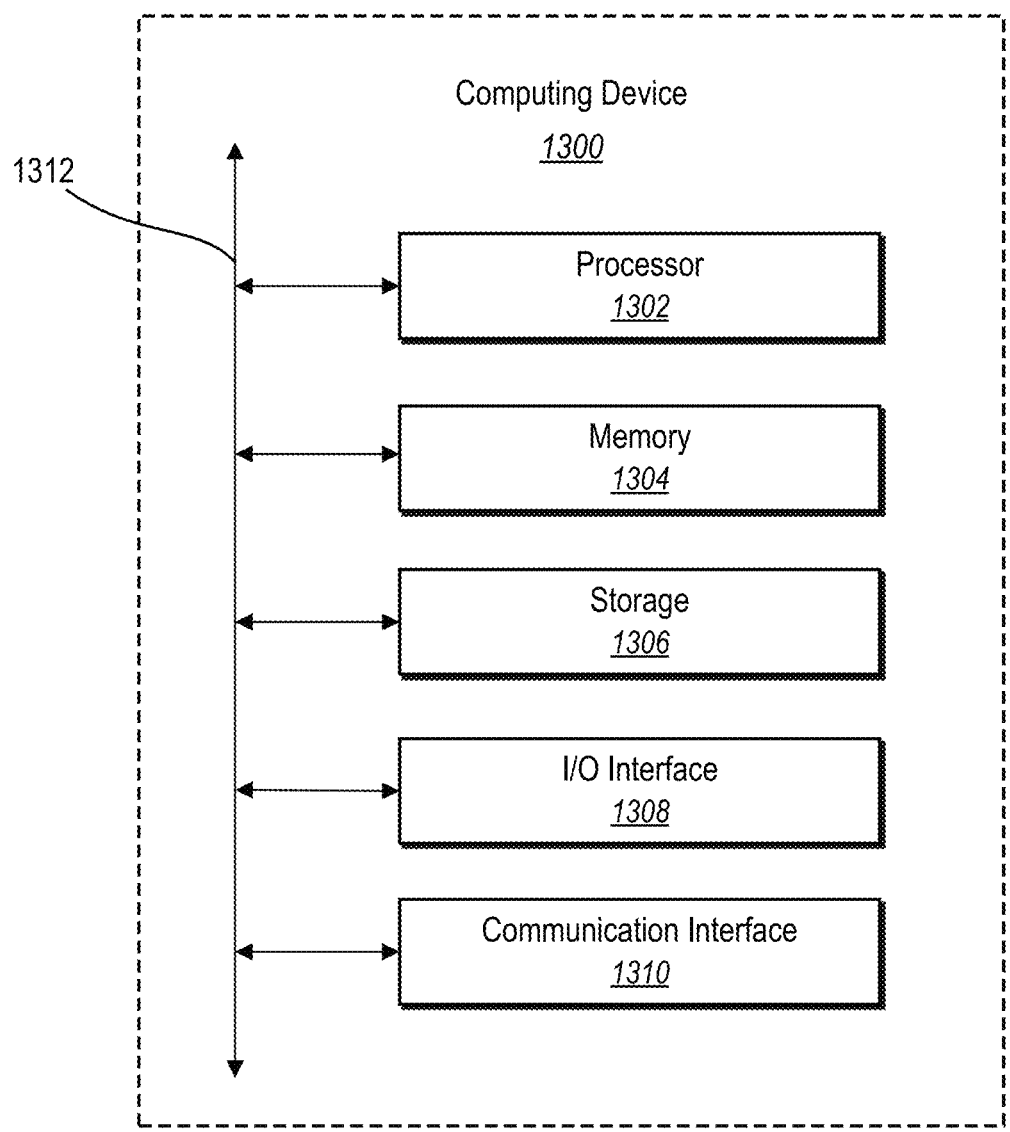
FIG. 13 illustrates a block diagram of an exemplary computing device in accordance with one or more embodiments.

FIG. 13 illustrates a block diagram of an example computing device 1300 that may be configured to perform one or more of the processes described above. One will appreciate that one or more computing devices, such as the computing device 1300 may represent the computing devices described above (e.g., the server(s) 106 and/or the client device 110). In one or more embodiments, the computing device 1300 may be a mobile device (e.g., a mobile telephone, a smartphone, a PDA, a tablet, a laptop, a camera, a tracker, a watch, a wearable device). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 including storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of computing device 1300 to each other.

In the foregoing specification, the invention has been described with reference to specific embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing executable instructions which, when executed by at least one processing device, cause the at least one processing device to perform operations comprising:

identifying, utilizing a multi-modal font machine-learning model comprising a glyph shape-aware machine learning model and a glyph metrics analyzer to process data in a unified latent space, a recommended font corresponding to a source font by:
  receiving, from a computing device, an indication of the source font;
  generating, utilizing an outline sequence encoders of the multi-modal font machine-learning model, a sequence embedding representing an outline for a reference glyph of the source font from sequence aspect features;
  generating, utilizing a local point encoder of the multi-modal font machine-learning model, a visual structure embedding from shape parameters of the reference glyph representing local points of the reference glyph;
  generating, utilizing the glyph metrics analyzer of the multi-modal font machine-learning model, a glyph metrics embedding for measurements of the reference glyph;
  generating, utilizing the multi-modal font machine-learning model, a multi-modal vector representing the source font by combining the sequence embedding, the visual structure embedding, and the glyph metrics embedding;
  comparing, in the unified latent space, the multi-modal vector indicating the sequence embedding, the visual structure embedding, and the glyph metrics embedding of the source font with candidate multi-modal vectors representing candidate fonts;
  identifying, utilizing inference layers in the unified latent space of the multi-modal font machine-learning model to process the multi-modal vector, the recommended font from a plurality of candidate fonts that corresponds to the source font.

2. The non-transitory computer-readable medium of claim 1, wherein generating the sequence embedding comprises:
  utilizing the outline sequence encoder to process the sequence aspect features comprising a rasterized image of the reference glyph and a vector outline of the reference glyph; and
  based on processing the sequence aspect features, generating the sequence embedding.

3. The non-transitory computer-readable medium of claim 1, wherein utilizing the inference layers in the unified latent space of the multi-modal font machine-learning model comprises:
  mapping the multi-modal vector in the unified latent space and the candidate multi-modal vectors representing the candidate fonts in the unified latent space;
  determining, utilizing fully connected layers of a feed forward neural network, measures of cosine similarity between the multi-modal vector and the candidate multi-modal vectors representing the candidate fonts; and
  generating, utilizing a softmax layer of the multi-modal font machine-learning model, a distribution of font probabilities relating to the measures of cosine similarity between the multi-modal vector and the candidate multi-modal vectors representing the candidate fonts.

4. The non-transitory computer-readable medium of claim 1, wherein generating the visual structure embedding representing the local points of the reference glyph further comprises generating, utilizing a local point encoder, a vector representing local structure points and comprising invariant features of the reference glyph based on a rasterized image of the reference glyph.

5. The non-transitory computer-readable medium of claim 1, wherein generating the glyph metrics embedding for measurements of the reference glyph further comprises:
  determining, utilizing the glyph metrics analyzer, glyph metrics of the reference glyph; and
  normalizing, utilizing a metrics normalizer, the glyph metrics based on a distribution of glyph metrics.

6. The non-transitory computer-readable medium of claim 5, wherein generating the glyph metrics further comprises determining at least one of a glyph width, a glyph height, a glyph ascender metric, a glyph descender metric, a lower-case height, an upper-case height, a stem width, an average glyph contrast, or a stem angle.

7. The non-transitory computer-readable medium of claim 1, wherein generating the multi-modal vector representing the source font further comprises concatenating the sequence embedding, the visual structure embedding, and the glyph metrics embedding.

8. The non-transitory computer-readable medium of claim 1, wherein generating the multi-modal vector comprises concatenating, utilizing a multi-layer perceptron, a raster embedding generated from the reference glyph of the source font, the sequence embedding, the visual structure embedding, and the glyph metrics embedding.

9. The non-transitory computer-readable medium of claim 1, wherein identifying the recommended font from the plurality of candidate fonts that corresponds to the source font further comprises:
  identifying natural language processing (NLP) tags classifying glyphs of candidate fonts;
  determining a subset of candidate fonts of the candidate fonts based on the NLP tags; and
  identifying, from the subset of candidate fonts, the recommended font corresponding to the source font based on the multi-modal vector, wherein the multi-modal vector comprises a concatenation of a raster embedding generated from the reference glyph of the source font, the sequence embedding, the visual structure embedding, and the glyph metrics embedding.

10. The non-transitory computer-readable medium of claim 1, wherein identifying the recommended font corresponding to the source font based on the multi-modal vector further comprises:
  determining, utilizing a cosine similarity model, cosine similarities between the multi-modal vector and the candidate multi-modal vectors representing the candidate fonts;
  generating, utilizing a softmax layer of the multi-modal font machine-learning model, a distribution of font probabilities relating to measures of cosine similarity between the multi-modal vector and the candidate multi-modal vectors; and
  determining, from among the candidate multi-modal vectors, a candidate multi-modal vector for the recommended font corresponding to a highest cosine similarity of the measures of cosine similarity.

11. A system comprising:
  at least one memory device comprising font files corresponding to candidate fonts; and
  at least one processor configured to cause the system to:
    identify, utilizing a multi-modal font machine-learning model comprising a glyph shape-aware machine learning model and a glyph metrics analyzer to process data in a unified latent space, a recommended font corresponding to a source font by:

receiving, from a computing device, an indication of the source font;

generating, utilizing an outline sequence encoders of the multi-modal font machine-learning model, a sequence embedding representing an outline for at least a reference glyph of the source font from sequence aspect features;

generating, utilizing a local point encoder of the multi-modal font machine-learning model, a visual structure embedding for at least the reference glyph of the source font from shape parameters of at least the reference glyph;

generating, utilizing the glyph metrics analyzer of the multi-modal font machine-learning model, a glyph metrics embedding for measurements of the reference glyph;

generating, utilizing a multi-layer perceptron of the multi-modal font machine-learning model, a multi-modal vector representing at least the reference glyph by combining the sequence embedding, the visual structure embedding, and the glyph metrics embedding;

comparing, in the unified latent space, the multi-modal vector indicating the sequence embedding, the visual structure embedding, and the glyph metrics embedding of the source font with candidate multi-modal vectors representing candidate fonts; and identifying, utilizing inference layers of the multi-modal font machine-learning model to process the multi-modal vector, the recommended font corresponding to the source font.

12. The system of claim 11, further comprises generating the sequence embedding, the visual structure embedding, and the glyph metrics embedding for multiple reference glyphs of the source font.

13. The system of claim 11, wherein generating the visual structure embedding further comprises:

extracting, from at least a rasterized image of at least the reference glyph, one or more local points; and generating, utilizing the local point encoder, a scale-invariant feature transform (SIFT) vector representing local structure points of at least the reference glyph.

14. The system of claim 11, wherein generating the glyph metrics embedding for measurements of at least the reference glyph further comprises:

generating, utilizing the glyph metrics analyzer, glyph metrics of at least the reference glyph;

processing dimensions for the glyph metrics of at least the reference glyph; and normalizing, by utilizing a glyph metric normalizer, the processed dimensions for the glyph metrics of at least the reference glyph.

15. The system of claim 11, generating the multi-modal vector representing the source font further comprises concatenating, utilizing a multi-modality blender algorithm, the sequence embedding, the visual structure embedding, and the glyph metrics embedding.

16. The system of claim 11, wherein identifying the recommended font corresponding to the source font based on the multi-modal vector further comprises:

identifying natural language processing (NLP) tags classifying glyphs of the candidate fonts;

removing a subset of candidate fonts of the candidate fonts based on the NLP tags; and identifying, from a remaining subset of candidate fonts of the candidate fonts, the recommended font corresponding to the source font based on the multi-modal vector.

17. The system of claim 11, wherein identifying the recommended font corresponding to the source font based on the multi-modal vector further comprises:

determining a final multi-modal vector representing the source font by:

generating a raster embedding representing a rasterized image of at least the reference glyph;

concatenating the sequence embedding, the visual structure embedding, the glyph metrics embedding, and the raster embedding; and identifying the recommended font from the multi-modal vector comprising the concatenation of the sequence embedding, the visual structure embedding, the glyph metrics embedding, and the raster embedding.

18. A method comprising:

identifying, utilizing a multi-modal font machine-learning model comprising a glyph shape-aware machine learning model and a glyph metrics analyzer to process data in a unified latent space, a recommended font corresponding to a source font by:

receiving, from a computing device, an indication of the source font;

generating, utilizing an outline sequence encoders of the multi-modal font machine-learning model, a sequence embedding representing an outline for at least a reference glyph of the source font from sequence aspect features;

generating, utilizing a local point encoder of the multi-modal font machine-learning model, a visual structure embedding for at least the reference glyph of the source font from shape parameters of the reference glyph;

generating, utilizing the glyph metrics analyzer of the multi-modal font machine-learning model, a glyph metrics embedding for measurements of at least the reference glyph;

generating, utilizing the multi-modal font machine-learning model, a multi-modal vector representing the source font by combining the sequence embedding, the visual structure embedding, and the glyph metrics embedding;

comparing, in the unified latent space, the multi-modal vector indicating the sequence embedding, the visual structure embedding, and the glyph metrics embedding of the source font with candidate multi-modal vectors representing candidate fonts; and identifying, utilizing inference layers of the multi-modal font machine-learning model to process the multi-modal vector, the recommended font corresponding to the source font.

19. The method of claim 18, further comprising training a convolutional neural network and a transformer model part of a glyph shape-aware machine learning model of the multi-modal font machine-learning model by:

receiving input glyphs from a font;

processing, utilizing the glyph shape-aware machine learning model, Bezier curves of same font styles for the font and raster versions generated from the Bezier curves;

learning parameters of sequence for the font and rasterization data for the font for the glyph shape-aware machine learning of the multi-modal font machine learning model based on processing the Bezier curves and the raster versions.

20. The method of claim 18, wherein generating the glyph metrics embedding for measurements of at least the reference glyph further comprises:
- determining, from metadata for multiple reference glyphs, glyph metrics of the multiple reference glyphs;
- processing the glyph metrics of the multiple reference glyphs for horizontal, vertical, and diagonal dimensions; and
- normalizing, by utilizing a glyph metric normalizer, the glyph metrics based on a distribution of glyph metrics.

\* \* \* \* \*